(12) United States Patent
Kong et al.

(10) Patent No.: US 12,024,059 B2
(45) Date of Patent: Jul. 2, 2024

(54) ACTIVE SAFETY MANAGEMENT SYSTEMS FOR MODULAR DYNAMICALLY ALLOCATED CAPACITY STORAGE SYSTEMS

(71) Applicant: GM GLOBAL TECHNOLOGY OPERATIONS LLC, Detroit, MI (US)

(72) Inventors: Dewen Kong, Shanghai (CN); Dave G. Rich, Sterling Heights, MI (US); Lyall K. Winger, Waterloo (CA); Aaron B. Bloom, Royal Oak, MI (US); Jingyuan Liu, Shanghai (CN); Meiyuan Wu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 17/565,647

(22) Filed: Dec. 30, 2021

(65) Prior Publication Data
US 2023/0110889 A1   Apr. 13, 2023

(30) Foreign Application Priority Data
Oct. 8, 2021   (CN) .......................... 202111170994.8

(51) Int. Cl.
*G06F 17/00* (2019.01)
*B60L 58/13* (2019.01)
(Continued)

(52) U.S. Cl.
CPC .............. *B60L 58/26* (2019.02); *B60L 58/13* (2019.02); *B60W 20/20* (2013.01); *G01C 21/3469* (2013.01)

(58) Field of Classification Search
CPC ........ B60L 58/26; B60L 58/13; B60L 3/0046; B60W 20/20; B60W 30/1843;
(Continued)

(56) References Cited

U.S. PATENT DOCUMENTS 6,909,201 B2   6/2005   Murty et al.
9,184,582 B2   11/2015  Koch et al.
(Continued)

FOREIGN PATENT DOCUMENTS

| CN | 111731147 A | * | 10/2020 | ............ B60L 3/0046 |
| CN | 115958954 A | * | 4/2023 | ............... B60K 6/48 |
| DE | 112010004705 T5 | * | 1/2013 | ............... B60K 6/48 |

OTHER PUBLICATIONS

General Motors Sparkles in 48 Volt, IDTechEx Reports (Year: 2020).*

(Continued)

*Primary Examiner* — Ronnie M Mancho

(57) ABSTRACT

A vehicle system is provided and includes a modular dynamically allocated capacity storage system (MODACS) and an active management module. The MODACS includes blocks of cells. The active management module is configured to: detect a first state of a first block of cells of the blocks of cells; determine whether a safety fault condition exists with the first block of cells based on the first state of the first block of cells; in response to detecting existence of the safety fault condition, isolate the first block of cells from other ones of the blocks of cells; subsequent to isolating the first block of cells, actively discharge and detect a second state of the first block of cells; and based on the second state, continue isolating the first block of cells or reconnecting the first block of cells such that the first block of cells is no longer isolated.

20 Claims, 15 Drawing Sheets

(51) Int. Cl.
*B60L 58/26* (2019.01)
*B60W 20/20* (2016.01)
*G01C 21/34* (2006.01)

(58) Field of Classification Search
CPC ..... B60W 2510/244; B60W 2510/246; B60W 2510/305; B60W 2710/248; B60W 10/26; B60W 10/30; B60W 20/13; B60W 20/50; B60W 2710/305; G01C 21/3469; B60K 6/485; B60K 2006/4825; B60K 6/48; Y02T 10/62; Y02T 10/70
USPC .......................................................... 701/22
See application file for complete search history.

(56) References Cited

U.S. PATENT DOCUMENTS

| | | | |
|---|---|---|---|
| 9,440,600 B2 | 9/2016 | Koch et al. | |
| 9,911,249 B2 | 3/2018 | Koch et al. | |
| 10,305,298 B2* | 5/2019 | Kristensen | H02J 7/0013 |
| 10,375,830 B2 | 8/2019 | Dawley et al. | |
| 10,395,442 B2 | 8/2019 | Conell et al. | |
| 10,777,998 B2 | 9/2020 | Conell et al. | |
| 10,800,285 B2* | 10/2020 | Rich | B60L 58/19 |
| 10,826,139 B2 | 11/2020 | Rich et al. | |
| 10,838,008 B2* | 11/2020 | Conell | G01R 31/3647 |
| 10,996,278 B2* | 5/2021 | Conell | G01R 31/3277 |
| 10,998,595 B2* | 5/2021 | Winger | H01M 10/0445 |
| 11,038,192 B2* | 6/2021 | Dawley | H01M 50/528 |
| 11,152,813 B2* | 10/2021 | Winger | H02J 1/082 |
| 11,156,665 B2* | 10/2021 | Rich | G01R 31/006 |
| 11,228,059 B2* | 1/2022 | Winger | H01M 10/4207 |
| 11,233,407 B2* | 1/2022 | Winger | B60L 50/64 |
| 11,235,748 B2* | 2/2022 | Rich | B60L 58/10 |
| 2019/0103750 A1* | 4/2019 | Kristensen | H01M 10/441 |
| 2020/0235444 A1 | 7/2020 | Yu et al. | |
| 2020/0278936 A1* | 9/2020 | Gopalakrishnan | G06F 1/26 |
| 2020/0384888 A1* | 12/2020 | Hasan | B60L 58/12 |
| 2020/0388874 A1* | 12/2020 | Dawley | H01M 4/70 |
| 2021/0151809 A1* | 5/2021 | Kong | G01R 31/3835 |
| 2021/0237578 A1* | 8/2021 | Ing | B60L 3/0069 |
| 2022/0021044 A1* | 1/2022 | Kong | H01M 10/6571 |
| 2022/0045379 A1 | 2/2022 | Rich et al. | |
| 2022/0098744 A1* | 3/2022 | Mills | H02S 40/22 |
| 2023/0110889 A1* | 4/2023 | Kong | B60W 20/20 701/22 |
| 2024/0044992 A1* | 2/2024 | Dernotte | G01R 31/3646 |

OTHER PUBLICATIONS

Characteristics of Battery Management Systems of Electric Vehicles with Consideration of the Active and Passive Cell Balancing Process (Year 2021) (Year: 2021).*
U.S. Appl. No. 17/401,651, filed Aug. 13, 2021, Bloom et al.
U.S. Appl. No. 17/561,031, filed Dec. 23, 2021, Liu et al.

* cited by examiner

ACTIVE SAFETY MANAGEMENT SYSTEMS FOR MODULAR DYNAMICALLY ALLOCATED CAPACITY STORAGE SYSTEMS

CROSS-REFERENCE TO RELATED APPLICATIONS

This application claims the benefit of Chinese Patent Application No. 202111170994.8, filed on Oct. 8, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery management systems of vehicles.

Traditional vehicles include an internal combustion engine that generates propulsion torque. All electric vehicles include one or more electric motors for propulsion and no internal combustion engine. Hybrid vehicles can include both an internal combustion engine and one or more electric motors for propulsion. The one or more electric motors are used to improve fuel efficiency. The electric motor and the internal combustion engine can be used in combination to achieve greater torque output than using only the internal combustion engine.

Example types of hybrid vehicles are parallel hybrid vehicles and series hybrid vehicles or mixture mode of parallel and series. In a parallel hybrid vehicle, an electric motor can work in parallel with an engine to combine power and range advantages of the engine with efficiency and regenerative braking advantages of the electric motor. In a series hybrid vehicle, an engine drives a generator to produce electricity for an electric motor, which drives a transmission. This allows the electric motor to assume some of the power responsibilities of the engine, which in turn allows for use of a smaller more fuel-efficient engine.

SUMMARY

A vehicle system is provided and includes a modular dynamically allocated capacity storage system (MODACS) and an active management module. The MODACS includes blocks of cells. The active management module is configured to: detect a first state of a first block of cells of the blocks of cells; determine whether a safety fault condition exists with the first block of cells based on the first state of the first block of cells; in response to detecting existence of the safety fault condition, isolate the first block of cells from other ones of the blocks of cells; subsequent to isolating the first block of cells, actively discharge and detect a second state of the first block of cells; and based on the second state, continue isolating the first block of cells or reconnecting the first block of cells such that the first block of cells is no longer isolated.

In other features, the MODACS includes a source terminal. The active management module is configured to: determine whether to connect the first block of cells to the source terminal or a thermal management system to discharge the first block of cells; and control the MODACS to connect the first block of cells to the source terminal or the thermal management system.

In other features, the active management module is configured to connect the first block of cells to the thermal management system when the safety fault condition exists and to the source terminal when the safety fault condition does not exist.

In other features, the thermal management system includes at least one of a cooling fan, a cooling pump, a cell balancing system, a resistive load, or a thermal electric generator.

In other features, the active management module is configured to run, via power from the first block of cells, at least one of the cooling fan or the cooling pump to cool at least one of the blocks of cells in response to the safety fault condition existing.

In other features, the first state and the second state of the first block of cells refers to at least one of: a current level of the first block of cells; a voltage level of the first block of cells; a power level of the first block of cells; a temperature of the first block of cells; or a rate of change in a parameter of the first block of cells.

In other features, the vehicle system further includes a thermal management system separate from the MODACS and including 12V thermal management system loads, where: the MODACS includes a first source terminal and a second source terminal; the first source terminal is connected to the 12V thermal management system loads; the second source terminal is connected to other loads; and the active management module is configured to determine whether to connect the first block of cells to the first source terminal or the second source terminal and control the MODACS to connect the first block of cells to the selected one of the first source terminal or the second source terminal.

In other features, the MODACS includes a thermal management system and a first source terminal connected to first loads. The active management module is configured to determine whether to connect the first block of cells to the first source terminal or the thermal management system and control the MODACS to connect the first block of cells to the selected one of the first source terminal or the thermal management system.

In other features, the MODACS includes a second source terminal connected to second loads. The active management module is configured to determine whether to connect the first block of cells to the first source terminal, the second source terminal or the thermal management system and control the MODACS to connect the first block of cells to the selected one of the first source terminal, the second source terminal or the thermal management system.

In other features, the MODACS includes: a first source terminal connected to first loads; a second source terminal connected to second loads; and a third source terminal connected to a thermal management system. The active management module is configured to determine whether to connect the first block of cells to the first source terminal, the second source terminal or the third source terminal and control the MODACS to connect the first block of cells to the selected one of the first source terminal, the second source terminal or the third source terminal.

In other features, a method of operating a MODACS is provided. The method includes: detecting a first state of a first block of cells of blocks of cells within the MODACS; determining whether a safety fault condition exists with the first block of cells based on the first state of the first block of cells; in response to detecting existence of the safety fault condition, isolating the first block of cells from other ones of the blocks of cells; subsequent to isolating the first block of cells, actively discharging and detecting a second state of the first block of cells; and based on the second state, continuing to isolate the first block of cells or reconnecting the first block of cells such that the first block of cells is no longer isolated.

In other features, the method further includes: determining whether to connect the first block of cells to a source terminal of the MODACS or a thermal management system to discharge the first block of cells; and controlling the MODACS to connect the first block of cells to the source terminal or the thermal management system.

In other features, the method further includes connecting the first block of cells to the thermal management system when the safety fault condition exists and to the source terminal when the safety fault condition does not exist.

In other features, the thermal management system includes at least one of a cooling fan, a cooling pump, a cell balancing system, a resistive load, or a thermal electric generator.

In other features, the method further includes running, via power from the first block of cells, at least one of the cooling fan or the cooling pump to cool at least one of the blocks of cells in response to the safety fault condition existing.

In other features, the first state and the second state of the first block of cells refers to at least one of: a current level of the first block of cells; a voltage level of the first block of cells; a power level of the first block of cells; a temperature of the first block of cells; or a rate of change in a parameter of the first block of cells.

In other features, the method further includes determining whether to connect the first block of cells to a first source terminal or a second source terminal of the MODACS and control the MODACS to connect the first block of cells to the selected one of the first source terminal or the second source terminal. The first source terminal is connected to 12V thermal management system loads. The 12V thermal management system loads are separate from the MODACS. The second source terminal is connected to other loads.

In other features, the method further includes determining whether to connect the first block of cells to a first source terminal of the MODACS or a thermal management system and control the MODACS to connect the first block of cells to the selected one of the first source terminal or the thermal management system. The MODACS includes the thermal management system. The first source terminal is connected to first loads.

In other features, the method further includes determining whether to connect the first block of cells to the first source terminal, a second source terminal or the thermal management system and control the MODACS to connect the first block of cells to the selected one of the first source terminal, the second source terminal or the thermal management system. The MODACS includes the second source terminal, which is connected to second loads.

In other features, the method further includes determining whether to connect the first block of cells to a first source terminal, a second source terminal or a third source terminal of the MODACS and control the MODACS to connect the first block of cells to the selected one of the first source terminal, the second source terminal or the third source terminal. The first source terminal is connected to first loads. The second source terminal is connected to second loads. The third source terminal is connected to a thermal management system.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
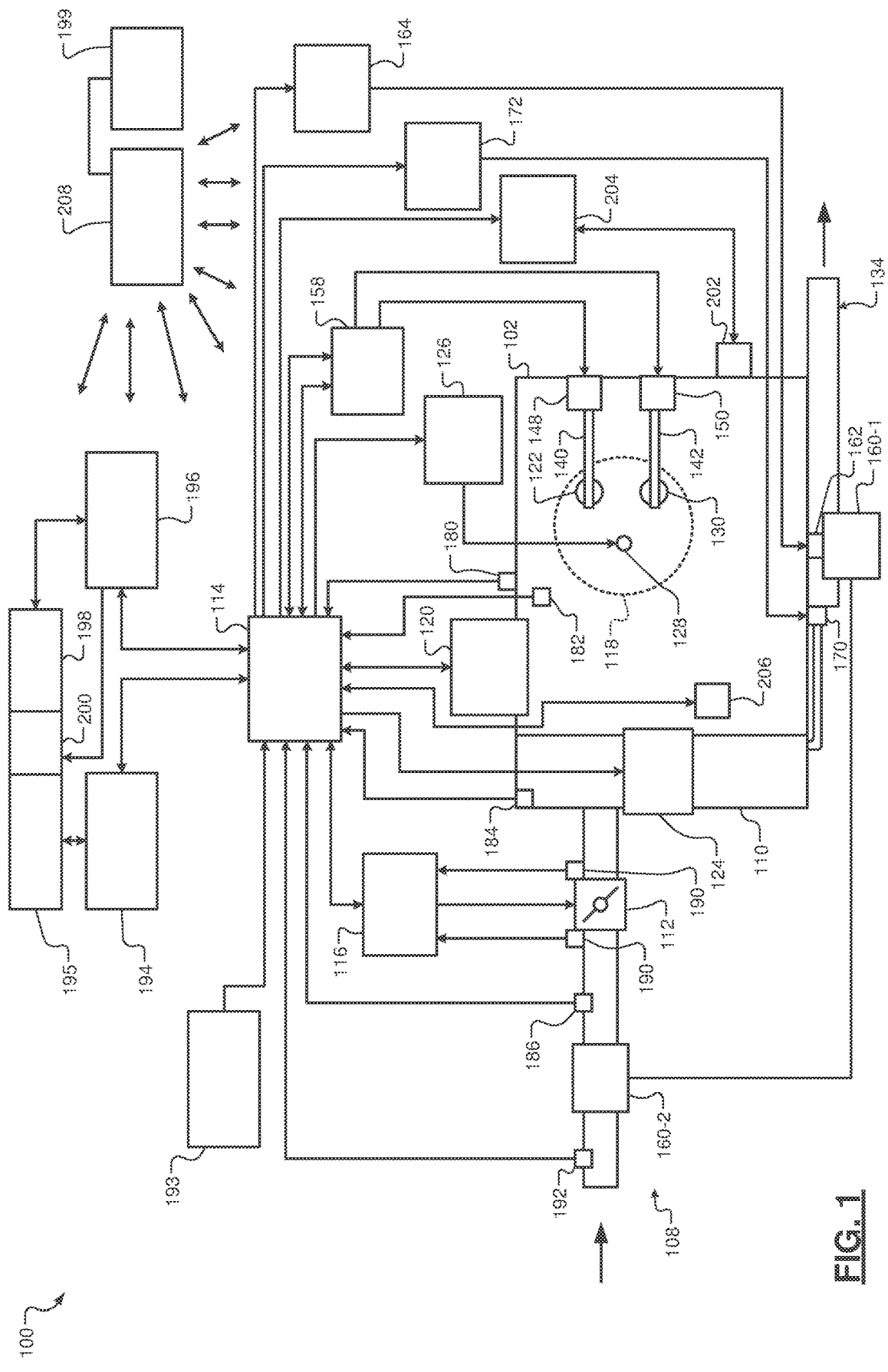
FIG. 1 is a functional block diagram of an example vehicle control system including a multiple output dynamic adjustable capacity battery system (MODACS) and an active safety management system (ASMS) in accordance with the present disclosure.

A MODACS includes blocks (or strings) of cells. The cells may be connected in series or in parallel. The blocks of cells may also be connected in series or in parallel to provide various output voltages, such as 12V and 48V to power 12V loads and 48V loads. The blocks of cells may be grouped. Each group of blocks of cells may be referred to as a module (or battery module). A MODACS may have multiple battery modules. A MODACS may be implemented as a single battery having a corresponding housing with a negative (or ground reference) terminal and multiple source terminals. Each of the source terminals of a MODACS may have a preset direct current (DC) voltage (e.g., 12 volts (V), 24V, 36V, 48V, etc.) and may supply (or discharge) current or receive current during charging. As an example, the MODACS may include a single 48V source terminal, a first 12V source terminal and a second 12V source terminal. Other examples are provided below.

The MODACS may operate as a low-voltage high-power system. When a safety fault arises in the MODACS, such as a short circuit or overcharging, a thermal runaway and/or propagation condition may occur. When a block overheats, this can cause temperatures of adjacent blocks to increase, which can result in additional faults. Passive safety techniques include disconnecting a block of cells that is suspicious of having a fault from a power grid of the MODACS. The block of cells may then be removed and/or sent to a quality assessment facility to determine (i) whether an issue exists with the block of cells, and (ii) whether the block of cells is serviceable or needs to be replaced.

Other passive techniques performed as a precaution in case of a fault include manufacturing blocks of cells for MODACS including certain material arrangements. This may include: disposing graphite film (or foil) between adjacent cells, which performs as a passive cooler; disposing phase change composite material between adjacent cells as a passive thermal runaway propagation preventer; and/or wrapping blocks of cells with fire proof material as a passive thermal runaway propagation preventer. If an abnormal safety fault condition exists with a block of cells, the block of cells needs to be quickly shutdown. In addition to the above-stated faults, another abnormal safety condition that can require a shutdown is an overheat condition, which results in an abnormal heat signal being generated indicating a block of cells is overheating. Other example fault conditions are described below.

The examples set forth herein include ASM systems and modules for actively monitoring cells and instantaneously and/or quickly disconnecting, discharging, isolating, and reevaluating conditions of cells. Programmed discharge protocols are utilized to detect a safety fault and quickly discharge the 12V block of cells (also referred to as a 12V string of cells) to prevent a system thermal runaway and propagation event while maintaining a non-interruption in functioning operation of a corresponding MODACS. The safety fault may be due to an internal short, an overcharging of cells, and/or other safety fault conditions. Quick and active discharge of a blocks of cells to a critical low SOC (e.g., less than 5%), quickly eliminates potential safety hazards that can arise when certain abnormal conditions exist.

When a 12V block safety fault (or suspicious) signal (e.g., an over temperature signal, an abnormal rate of change in voltage signal, an abnormal rate of change in temperature signal, and/or other irregularity signal) is generated and diagnosed, the ASM system adjusts a working mode of the suspicious block of cells and/or working modes of one or more other blocks of cells. The actions may include disconnecting and/or isolating the suspicious block of cells while continuing to operate normally or in a derated state and connecting at least the suspicious block of cells to thermal management system (TMS) loads and performing a discharging process according to the programmed discharging protocols. The programmed discharging protocols may include operation in a constant voltage mode, a constant current mode, or a mixed mode to discharge the block of cells until a state of charge of the block of cells is less than a predetermined threshold (e.g., less than 5% of a full charge). This is accomplished in a short period of time to remove any safety hazard potential to the MODACS and/or vehicle system. While discharging the block of cells, the ASM system adjusts operation of other blocks of cells that are in a "good" operating condition to continue operation according to power grid priorities. This may include distributing voltage, current, and/or power capacity of the good blocks of cells between redundant rails to satisfy power demands.

The implementations disclosed herein may be applied to internal combustion engine (ICE) vehicles, fully electric vehicles, battery electric vehicles (BEVs), hybrid electric vehicles including plug-in hybrid electric vehicles (PHEVs), partially or fully autonomous vehicles, and other types of vehicles including a with MODACS for improved fuel economy and other advantages.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous, partially autonomous or fully autonomous.

Air is drawn into the engine 102 through an intake system 108. The intake system 108 may include an intake manifold 110 and a throttle valve 112. For example only, the throttle valve 112 may include a butterfly valve having a rotatable blade. An engine (or vehicle) control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 may include any number of cylinders, for illustration purposes a single representative cylinder 118 is shown. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The engine 102 may be a homogenous charge compression ignition (HCCI) engine that performs both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders. During an exhaust stroke, the piston begins moving up and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a MODACS 208 to the electric motor 198 to cause the electric motor 198 to output positive torque. The MODACS 208 is further described below. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing. The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the MODACS 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the MODACS 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

A MODACS control module may be attached to, implemented in or be connected externally to the housing of the MODACS. The MODACS control module may be implemented partially or fully at the housing or at a remote location. As an example, the MODACS control module may be implemented as a control module within a vehicle and/or as part of a vehicle control module. An example MODACS control module and example vehicle control modules are shown in FIGS. 2 and 4-6.

The housing of the MODACS may include switches and battery monitoring (or management) system (BMS) modules. The switches and BMS modules may be connected to and/or implemented separate from the cells. The MODACS control module controls operating states of the switches to connect selected ones of the cells to the source terminals based on information from the BMS modules. Any number of the cells, blocks and/or battery modules may be selected and connected to each of the source terminals at any moment in time. The cells, blocks and battery modules may be connected: in series and/or in parallel; in different connected configurations; and may be organized into blocks, packs, and/or groups. Each block may include one or more cells, which may be connected in series and/or in parallel. Each pack may include one or more blocks, which may be connected in series and/or in parallel. Each group may include one or more packs, which may be connected in series and/or in parallel. The groups may be connected in series and/or in parallel. A battery module may refer to one or more packs and/or one or more groups.

Each of the BMS modules may be assigned to one or more cells, one or more blocks, one or more packs, and/or one or more groups and monitor corresponding parameters, such as voltages, temperatures, current levels, SOXs, instantaneous power and/or current limits, short-term power and/or current limits, and/or continuous power and/or current limits. The acronym "SOX" refers to a state of charge (SOC), a state of health (SOH), state of power (SOP), and/or a state of function (SOF). The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group. The SOF of a cell, pack and/or group may refer to a current temperature, voltage, and/or current level supplied to or sourced from the cell, pack and/or group, and/or other parameters describing a current functional state of the cell, pack and/or group.

Instantaneous power and current limits may refer to power and current limits for a short period of time (e.g., less than 2 seconds). Short term power and current limits may refer to power and current limits for an intermediate length of time (e.g., 2-3 seconds). Continuous power and current limits refer to power and current limits for an extended period of time (e.g., periods greater than 3 seconds).

A MODACS control module controls the states of the switches to connect the cells to the source terminals while satisfying target and/or requested voltages, currents and power capacities. The MODACS control module and/or a vehicle control module may set the target and/or requested voltages, currents and power capacities, for example, based on a mode of operation. A MODACS may operate in different operating modes, which correspond to vehicle operating modes, as described below. The MODACS operating modes may include, for example, a regenerative mode, a boost mode, an autostart mode, or other MODACS charge or discharge modes. The vehicle operating modes may include an electric vehicle launch mode, an engine start mode, an engine assist mode, an opportunity charging mode, a deceleration fuel cut-off (DFCO) regenerative mode, an electric vehicle regenerative mode (e.g., a generator DFCO regenerative mode or a brake regenerative mode), an electric vehicle cruise mode, and/or other vehicle operating mode. Additional vehicle operating modes are described below. Each of the vehicle operating modes corresponds to one of the MODACS modes. The stated modes are further described below.

The MODACs 208 may be connected to a thermal management system (TMS) 199. The TMS 199 (also shown in FIG. 5) is used for maintaining the temperature of MODACS and also for discharging suspicious and/or faulty blocks of cells. Discharging of the suspicious and/or faulty blocks of cells is further described below.

Figure 2:
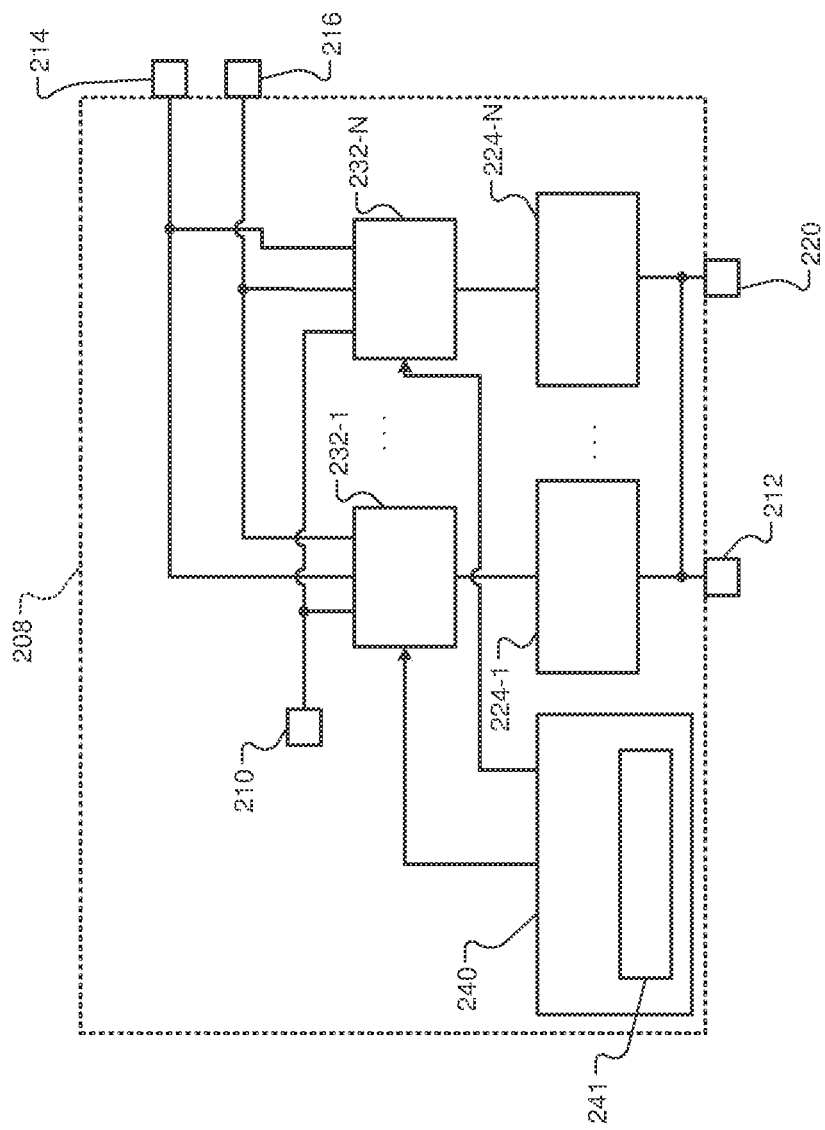
FIG. 2 is a functional block diagram of an example MODACS in accordance with the present disclosure.

FIG. 2 is a functional block diagram of the MODACS 208. The MODACS 208 may be implemented as a single battery having multiple source terminals. Three example source terminals 210, 214, 216 are shown, although any number of source terminals may be included. The source terminals, which may be referred to as positive output terminals, provide respective direct current (DC) operating voltages. The MODACS may include only one negative terminal or may include a negative terminal for each source terminal. For example only, the MODACS 208 may have a first positive (e.g., 48 Volt (V)) terminal 210, a first negative terminal 212, a second positive (e.g., a first 12V) terminal 214, a third positive (e.g., a second 12V) terminal 216, and a second negative terminal 220. While the example of the MODACS 208 having a 48V operating voltage and two 12V operating voltages is provided, the MODACS 208 may have one or more other operating voltages, such as only two 12V operating voltages, only two 48V operating voltages, two 48V operating voltages and a 12V operating voltage, or a combination of two or more other suitable operating voltages. As another example, the operating voltages may range from 12V-144V.

The MODACS 208 includes cells and/or blocks of cells, such as a first block (or string) 224-1 to an N-th block (or string) 224-N ("blocks 224"), where N is an integer greater than or equal to 2. Each of the blocks 224 may include one or more cells. Each block may also be separately replaceable within the MODACS 208. For example only, each of the blocks 224 may be an individually housed 12V DC battery. The ability to individually replace the blocks 224 may enable the MODACS 208 to include a shorter warranty period and have a lower warranty cost. The blocks 224 are also individually isolatable, for example, in the event of a fault in a block. In various implementations, the MODACS 208 may have the form factor of a standard automotive grade 12V battery.

Each of the blocks 224 has its own separate capacity (e.g., in amp hours, Ah). The MODACS 208 includes switches, such as first switches 232-1 to 232-N (collectively "switches 232"). The switches 232 enable the blocks 224 to be connected in series, parallel, or combinations of series and parallel to provide desired output voltages and capacities at the output terminals. Although examples of some switches are shown, other switches may be included to perform the various operations disclosed herein.

A MODACS control module 240 includes an ASM module 241 and may control the switches 232 to provide desired output voltages and capacities at the source terminals. The MODACS control module 240 controls the switches 232 to vary the capacity provided at the source terminals based on a present operating mode of the vehicle, as discussed further below. The ASM module 241 may also control the stated switches 232 to disconnect, isolate, discharge, test and/or reconnect blocks of cells from the power grid, which includes the other blocks of cells, source terminals, negative terminals, etc. Operations of the ASM module 241 are further described below.

Figure 3A:
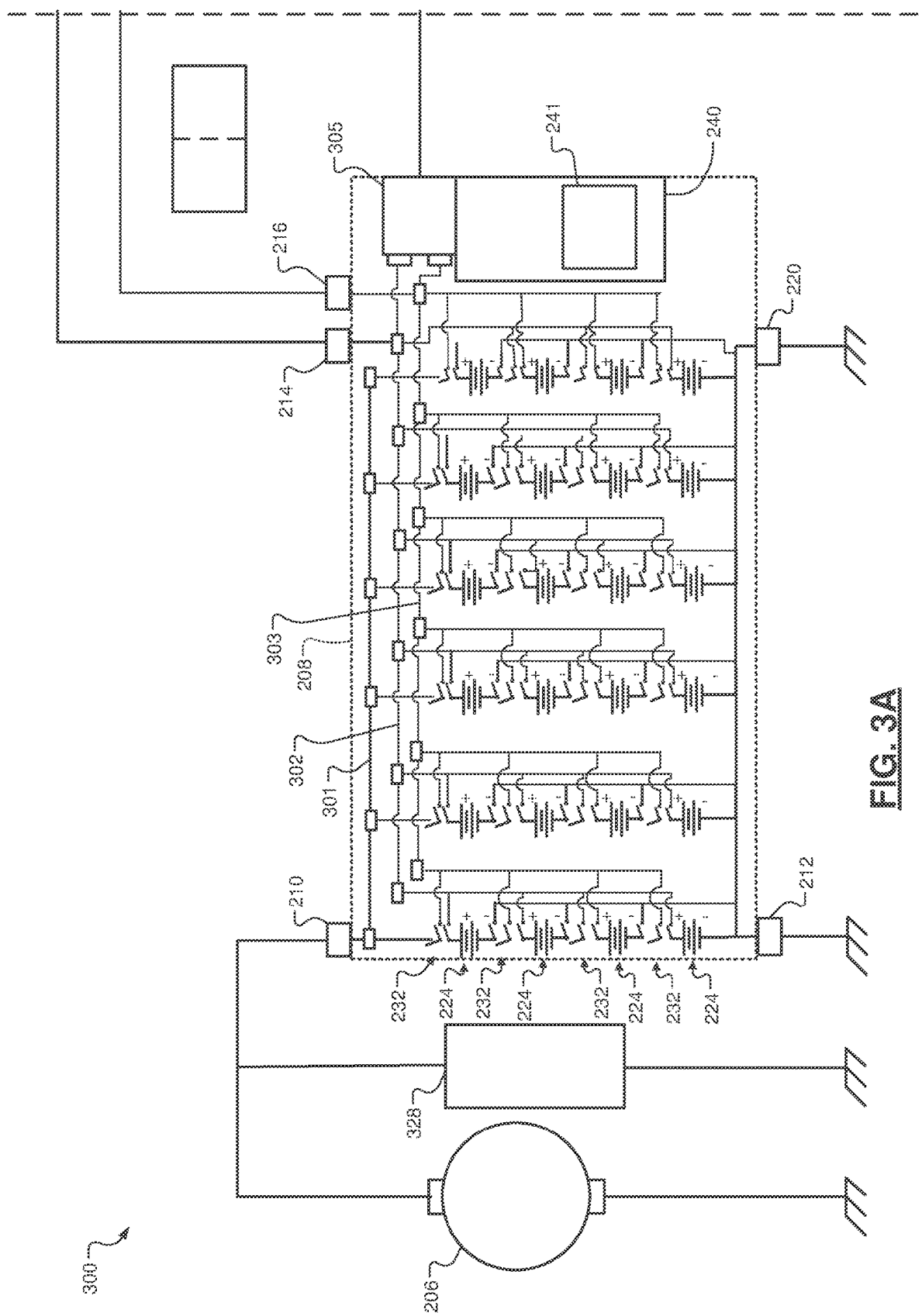
FIGS. 3A-3B are a schematic including an example implementation of a MODACS in accordance with the present disclosure.
Figure 3B:
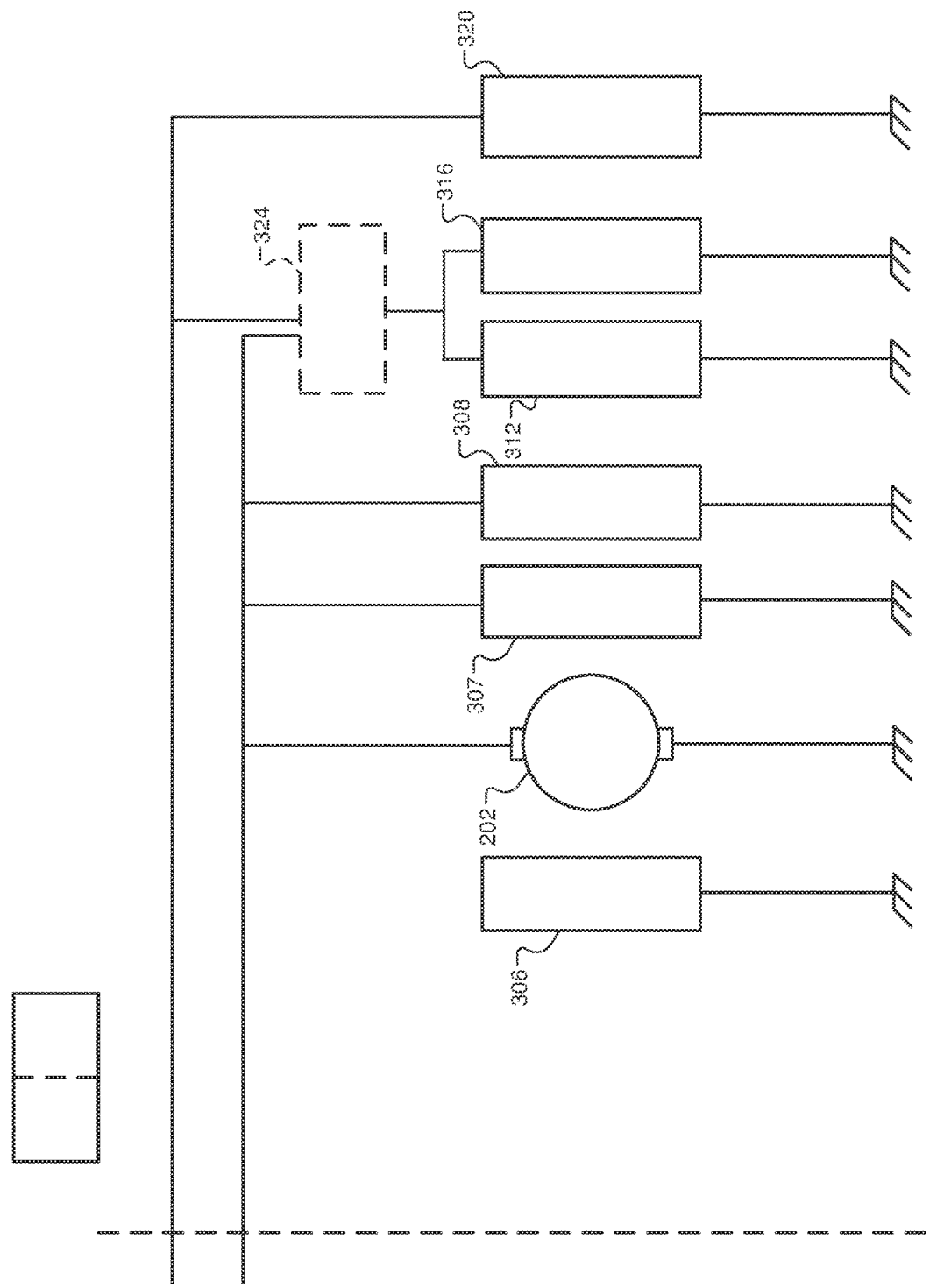

FIGS. 3A-3B show a vehicle electrical system 300 including an example implementation of the MODACS 208. The MODACS 208 includes the source terminals 210, 214, 216, respective power rails 301, 302, 303, a MODACS control module 240, and a power control circuit 305, which may be connected to the MODACS control module 240 and vehicle control module (VCM) and/or BCM 306. The VCM and/or BCM 306 may operate similar as, include and/or be implemented as the ECM 114 of FIG. 5. Power rail 303 may be a redundant power rail and/or used for different loads than the power rail 302. The MODACS control module 240 including the ASM module 241, the power control circuit 305, the VCM and/or the BCM 306 may communicate with each other via a controller area network (CAN), a local interconnect network (LIN), a serial network, wirelessly and/or another suitable network and/or interface. The MODACS control module 240 may communicate with the VCM and/or BCM 306 directly or indirectly via the power control circuit 305 as shown.

In the example of FIG. 3A, sets of 4 of the blocks 224 (e.g., 12V blocks) are connectable in series (via ones of the switches 232) to the first positive terminal 210 and the first negative terminal 212 to provide a first output voltage (e.g., 48V). Individual ones of the blocks 224 may be connected (via ones of the switches 232) to the second positive terminal 214 or the third positive terminal 216 and the second negative terminal 220 to provide a second output voltage (e.g., 12V) at the second and third positive terminals 214 and 216. How many of the blocks 224 are connected to the first positive terminal 210, the second positive terminal 214, and the third positive terminal 216 dictates the portions of the overall capacity of the MODACS 208 available at each of the positive terminals. Any number of the blocks may be connected in series and any number of series sets may be connected in parallel. In the example of FIG. 3A, the blocks 224 are shown with battery symbols. Each block may include, as an example, four cells, where each cell is connected in series and is a lithium ion cell (e.g., a lithium iron battery (LFP) cell with a nominal voltage at 3.2V).

As shown in FIG. 3B, a first set of vehicle electrical components operates using one of the two or more operating voltages of the MODACS 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the VCM and/or BCM 306 and other control modules of the vehicle, the starter motor 202, and/or other electrical loads, such as first 12V loads 307, second 12V loads 308, other control modules 312, third 12V loads 316, and fourth 12V loads 320. In various implementations, a switching device 324 may be connected to both of the first and second positive terminals 214. The switching device 324 may connect the other control modules 312 and the third 12V loads 316 to the second positive terminal 214 or the third positive terminal 216.

As shown in FIG. 3A, a second set of vehicle electrical components operates using another one of the two or more operating voltages of the MODACS 208. For example, the second set of vehicle electrical components may be connected to the first positive terminal 210. The second set of vehicle electrical components may include, for example but not limited to, the generator 206 and various electrical loads, such as 48V loads 328. The generator 206 may be controlled to recharge the MODACS 208.

Each of the switches 232 may be an insulated gate bipolar transistor (IGBT), a field effect transistor (FET), such as a metal oxide semiconductor FET (MOSFET), or another suitable type of switch.

Figure 4:
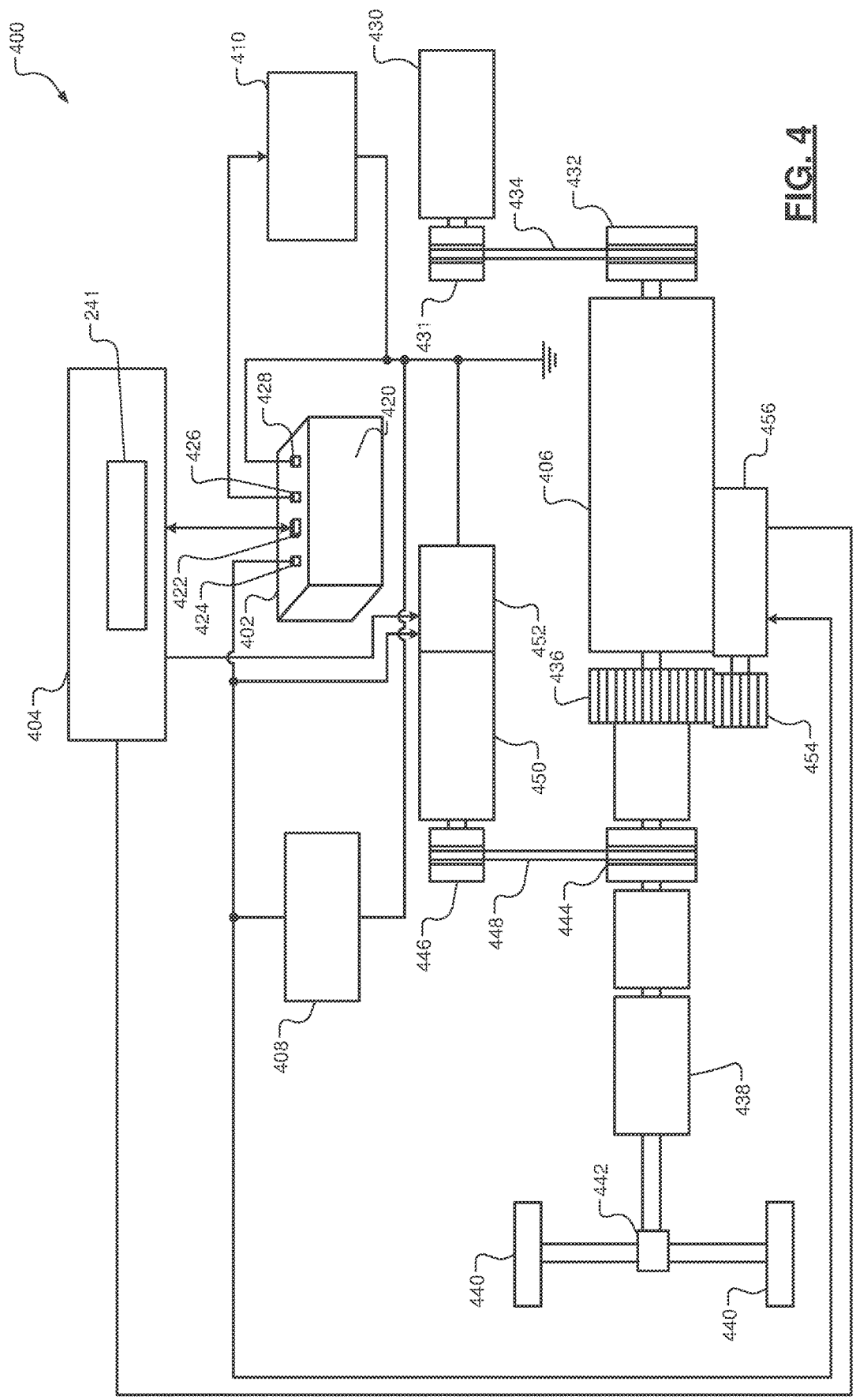
FIG. 4 is a functional block diagram of another example of a vehicle control system including a vehicle control module with an active safety management (ASM) module in accordance with the present disclosure.

FIG. 4 shows an example of another vehicle control system 400 that is applicable to the MODACSs disclosed herein. The vehicle control system 400 includes a MODACS 402, a vehicle control module 404, an internal combustion engine (ICE) 406, high-voltage loads 408, and low-voltage loads 410. The vehicle control module 404 may operate similarly as the other vehicle control modules referred to herein and may include the ASM module 241. The high-voltage loads 408 may include electric motors, compressors, and/or other high-voltage loads. The low-voltage loads may include lights, seat heaters, electric fans, audio system, video system, power window motors, power door lock motors, electronic circuits, etc. The MODACS 402 has a housing 420 and includes a MODACS control module 422, a first source terminal 424, a second source terminal 426 and a negative (or reference ground) terminal 428. The MODACS 402 may have any number of source terminals.

The ICE 406 may drive a water pump 430 via pulleys 431, 432 and belt 434. The ICE 406 may drive a main gear 436, which drives a clutches C1, C2 and a transmission 438 to drive wheels 440 via a differential 442. The first clutch C1 may be used to engage pulleys 444, 446 and belt 448, which drive a motor generator unit (MGU) 450. The second clutch C2 may be used to engage the transmission 438. An AC-to-DC converter 452 converts alternating current (AC) power from the MGU 450 to DC power, which is used to charge the cells of the MODACS 402. The main gear 436 may be turned by a second gear 454 via a starter 456 when cranking the ICE 406.

Figure 5:
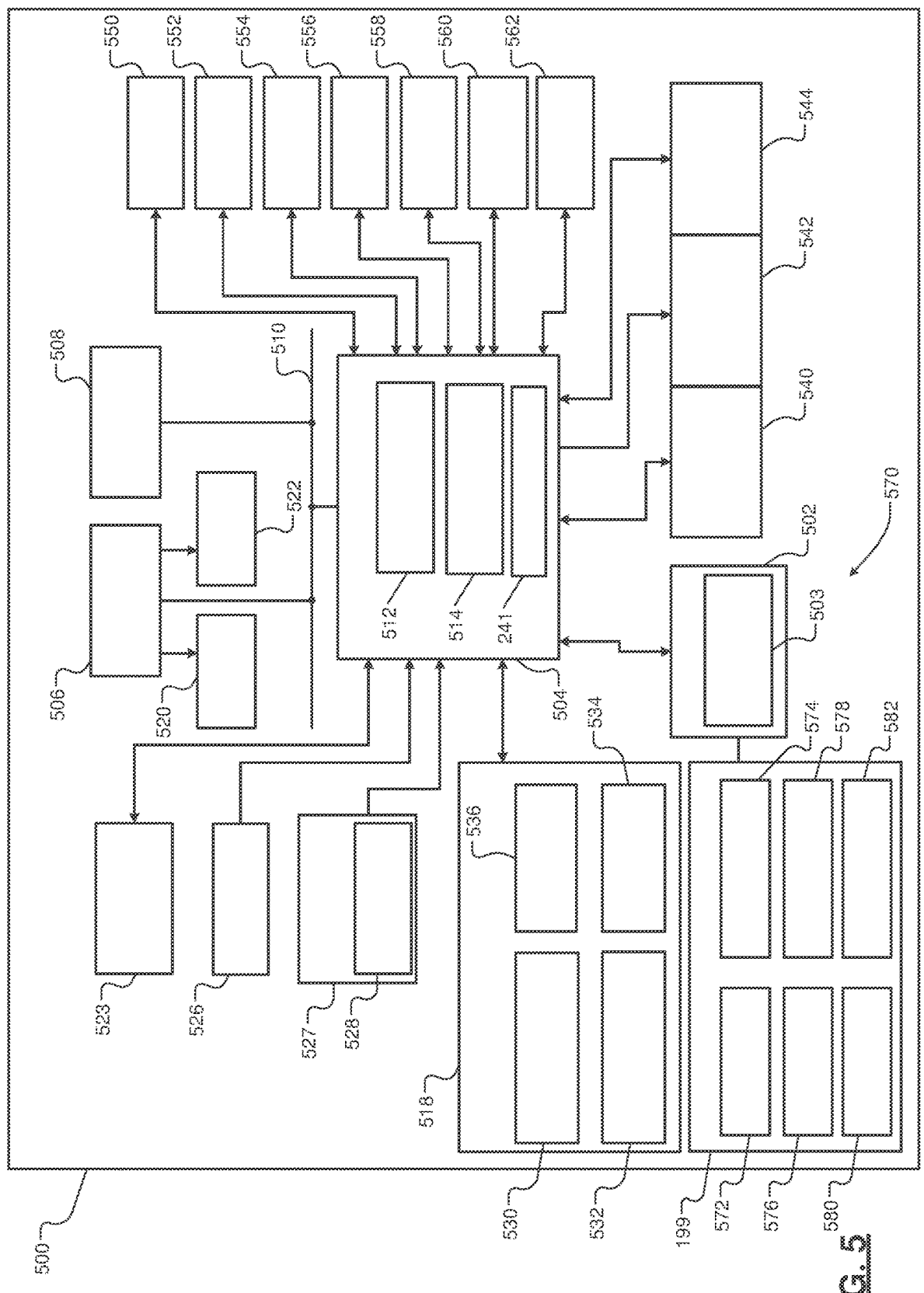
FIG. 5 is a functional block diagram of an example vehicle including a MODACS and a vehicle control module including an ASM module in accordance with the present disclosure.

FIG. 5 shows a vehicle 500 illustrating another example implementation of a MODACS, which may replace and/or operate similarly as the MODACS 208 and 402 of FIGS. 1-4. The vehicle 500 may include a MODACS 502 with a MODACS control module 503, a vehicle control module 504, an infotainment module 506 and other control modules 508. The modules 503, 504, 506, 508 may communicate with each other via a controller area network (CAN) bus 510 and/or other suitable interfaces. The vehicle control module 504 may control operation of vehicles systems. The vehicle control module 504 may include a mode selection module 512, a parameter adjustment module 514, as well as other modules. The mode selection module 512 may select a vehicle operating mode, such as one of the vehicle operating modes stated above. The parameter adjustment module 514 may be used to adjust parameters of the vehicle 500.

The vehicle 500 may further include: a memory 518; a display 520; an audio system 522; one or more transceivers 523 including sensors 526; and a navigation system 527 including a global positioning system (GPS) receiver 528. The sensors 526 may include sensors, cameras, objection detection sensors, temperature sensors, accelerometers, vehicle velocity sensor, and/or other sensors. The GPS receiver 528 may provide vehicle velocity and/or direction (or heading) of the vehicle and/or global clock timing information.

The memory 518 may store sensor data 530 and/or vehicle parameters 532, MODACS parameters 534, and applications 536. The applications 536 may include applications executed by the modules 503, 504, 506, 508. Although the memory 518 and the vehicle control module 504 are shown as separate devices, the memory 518 and the vehicle control module 504 may be implemented as a single device.

The vehicle control module 504 may control operation of an engine 540, a converter/generator 542, a transmission 544, a window/door system 550, a lighting system 552, a seating system 554, a mirror system 556, a brake system 558, electric motors 560 and/or a steering system 562 according to parameters set by the modules 503, 504, 506, 508. The vehicle control module 504 may set some of the parameters based on signals received from the sensors 526. The vehicle control module 504 may receive power from the MODACS 502, which may be provided to the engine 540, the converter/generator 542, the transmission 544, the window/door system 550, the lighting system 552, the seating system 554, the mirror system 556, the brake system 558, the electric motors 560 and/or the steering system 562, etc. Some of the vehicle control operations may include unlocking doors of the window/door system 550, enabling fuel and spark of the engine 540, starting the electric motors 560, powering any of the systems 550, 552, 554, 556, 558, 562, and/or performing other operations as are further described herein.

The engine 540, the converter/generator 542, the transmission 544, the window/door system 550, the lighting system 552, the seating system 554, the mirror system 556, the brake system 558, the electric motors 560 and/or the steering system 562 may include actuators controlled by the vehicle control module 504 to, for example, adjust fuel, spark, air flow, steering wheel angle, throttle position, pedal position, door locks, window position, seat angles, etc. This control may be based on the outputs of the sensors 526, the navigation system 527, the GPS receiver 528 and the above-stated data and information stored in the memory 518.

The vehicle control module 504 may determine various parameters including a vehicle speed, an engine speed, an engine torque, a gear state, an accelerometer position, a brake pedal position, an amount of regenerative (charge) power, an amount of boost (discharge) power, an amount of autostart/stop discharge power, and/or other information, such as priority levels of source terminals of the MODACS 502, power, current and voltage demands for each source terminal, etc. The vehicle control module 504 may share this information and the vehicle operating mode with the MODACS control module 503. The MODACS control module 503 may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values cells, blocks, packs, and/or groups; temperatures of cells, blocks, packs, and/or groups; current values of cells, blocks, packs, and/or groups; power values cells, blocks, packs, and/or groups; etc. The MODACS control module 503 may determine connected configurations of the cells and corresponding switch states as described herein based on the parameters determined by the vehicle control module 504 and/or the MODACS control module 503.

The vehicle 500 includes an ASM system 570, which includes the ASM module 241, the MODACS 502, the MODACS control module 503 and the TMS 199. Although shown in the vehicle control module 504, the ASM module 241 may be included in the MODACS control module 503. In one embodiment, the vehicle control module 504 and the MODACS control module 503 are implemented as a single control module. The ASM module 241 may control connection to and operation of the TMS 199. The TMS 199 may include a cooling fan 572, a cooling pump 574, a cell balancing system 576, a thermal electric generator (e.g., a Peltier cooler) 578, a resistive load 580 and/or other TMS loads 582. The cooling fan 572 and the cooling pump 574 may be used to circulate air and/or a coolant through the MODACS 502. Discharging suspicious and/or faulty cells by powering the cooling fan 572 and/or the cooling pump 574 serves multiple purposes. The powering of the cooling fan 572 and/or the cooling pump 574 cools cells of the MODACS 502 including the suspicious and/or faulty cells while the charge of the suspicious and/or faulty cells is reduced or suspended. This removes a potential hazard associated with the suspicious and/or faulty cells. The fan may also be reversed if the airflow provides cooler air in this direction.

The cell balancing system 576 may be used to slowly discharge suspicious and/or faulty cells including slowly transferring charge from the suspicious and/or faulty cells to other cells. As an example, the resistive load 580 may include stacked and/or alternating layers of graphene, polymer, and/or other resistive layers. Graphene is a passive cooler active heater with low resistance and thus aids in discharging cells without generating a significant and/or abnormal amount of heat. Any of the TMS loads 572, 574, 576, 578, 580, 582 may be connected to discharge the suspicious and/or faulty cells. The connection of the TMS loads may also reduce risk of a thermal chain reaction with cells adjacent the suspicious and/or faulty cells.

Figure 6:
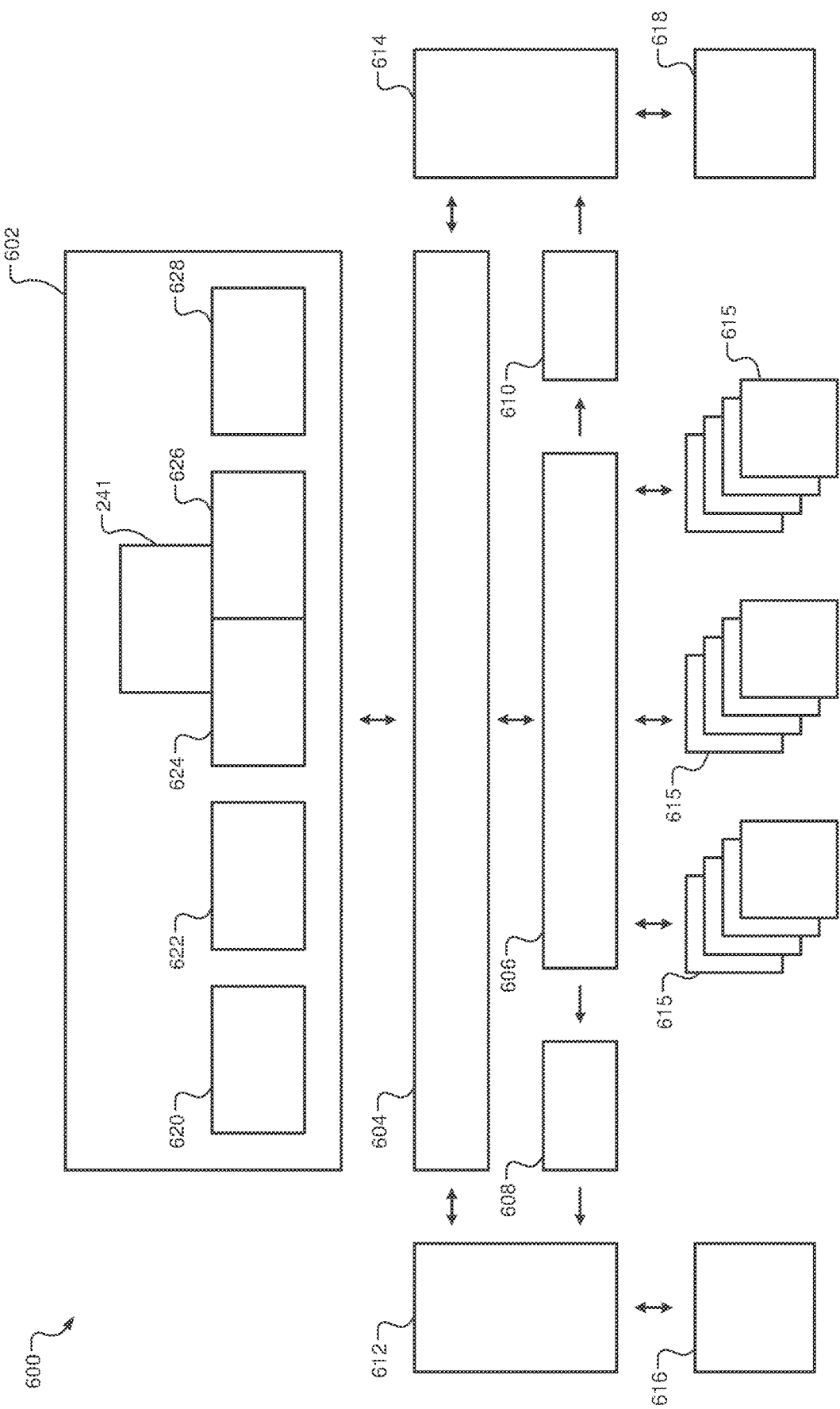
FIG. 6 is a functional block diagram of an example control portion of a vehicle control system in accordance with the present disclosure.

FIG. 6 is a functional block diagram of an example control portion of a vehicle control system 600. The vehicle control system 600 includes: a vehicle control module 602; a switch control layer 604; bus bars and sensors 606; hardware 608, 610; 12V switches 612; 48V switches 614; four series cell stacks (or blocks) 615; 12V loads 616; and 48V loads 618. The vehicle control module 602 may include a safety and onboard diagnostic module 620, a power planning module 622, an automotive safety integrity level (ASIL) module 624, the ASM module 241, an advanced (or autonomous) driving assistance system (ADAS) module 626, and/or a mode module 628. As an example three sets of four blocks are shown. Each set may be referred to as a battery module.

The onboard diagnostic module 620 may perform system diagnostics and reporting. The power planning module 622 may receive power requests and plan power usage over time. In one embodiment, the ASM module 241, the ASIL module 624, and the ADAS module 626 are implemented as a single module. The modules 241, 624, 626 perform safety monitoring, reporting and counterbalancing operations. These operations pertain to states of cells of a MODACS and include monitoring states of the cells and connecting, disconnecting, isolating, cooling, and discharging the cells. The ASIL module 624 may control modes of operation based on current safety status levels of a MODACS and/or vehicle system. The ADAS module 626 may control providing power while operating in an autonomous mode. The mode module 628 may select the operating mode or modes of the vehicle control system 600 and/or portions thereof. The switch control layer 604 may control states of the switches 612, 614. The bus bars and sensors 606 may include 12V and 48V bus bars and sensors for detecting states of the blocks 615.

Figure 7:
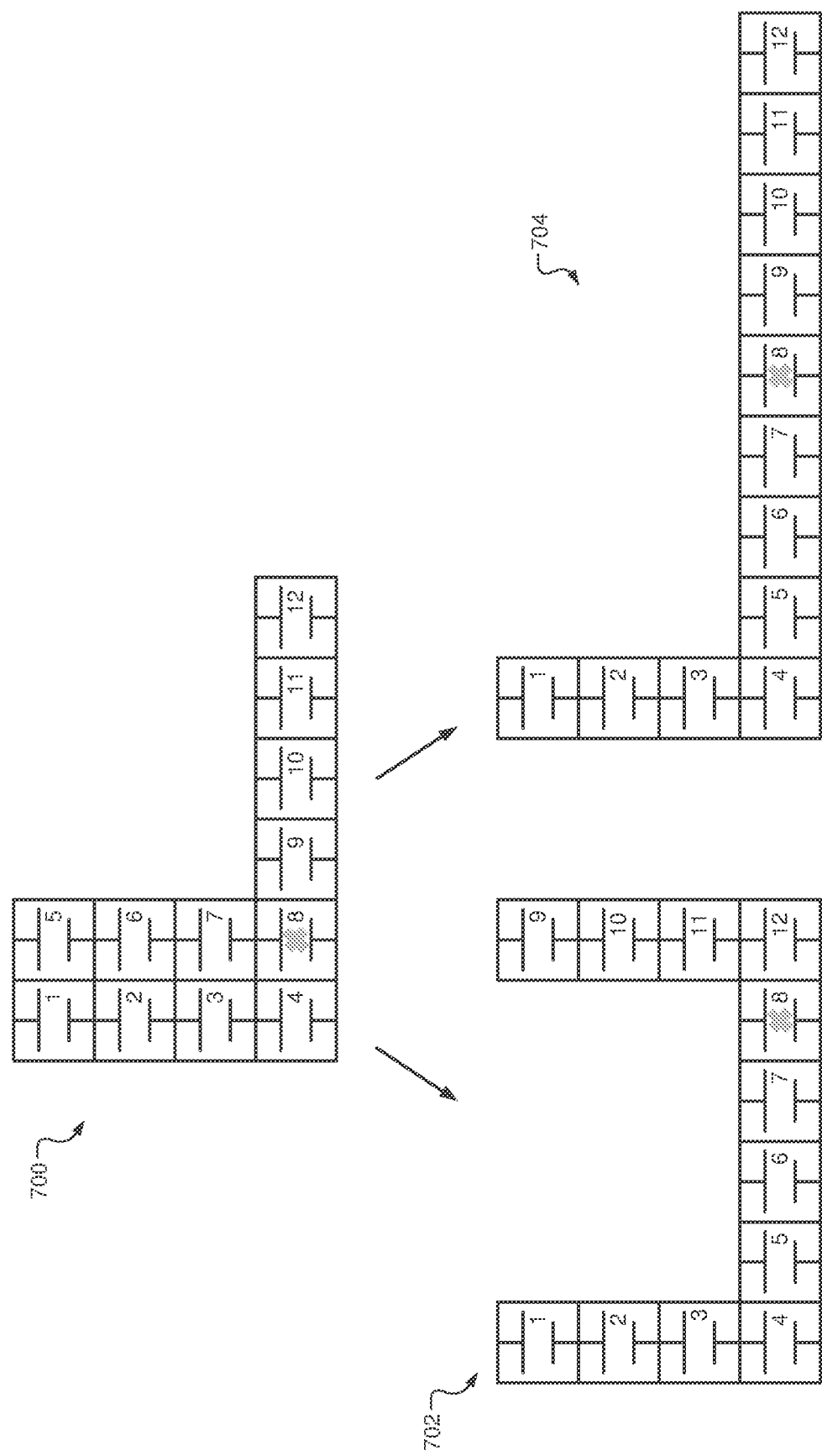
FIG. 7 is a diagram illustrating reconfiguring MODACS modules and blocks of cells due to detection of a suspicious block in accordance with the present disclosure.

FIG. 7 is a diagram illustrating reconfiguring MODACS modules and blocks of cells due to detection of a suspicious block of cells. FIG. 7 is applicable to any of the embodiments disclosed herein. Blocks of cells 1-12 are shown, where block 8 is determined to be a suspicious block. A suspicious block is a block determined to have satisfied one or more safety fault conditions, which are further described below. As an example, three battery modules are shown; a first module including blocks 1-4, a second module including blocks 5-8, and a third module including blocks 9-12. The blocks of the modules may be connected in series or in parallel. In the diagram, the blocks that are shown arranged horizontally (or laterally across the page) are connected in parallel. The blocks that are shown arranged vertically (or in a top-to-bottom of page arrangement) are connected in series. Three arrangements are shown; a serial (S)-S-parallel (P) arrangement (designated 700); a SPS arrangement (designated 702); and a SPP arrangement (designated 704). Cell balancing may be performed within the blocks and/or between the blocks.

During operation, states of the blocks 1-12 are monitored including SOC, SOH, and SOP of the blocks. As shown, the first and second battery modules are connected in series to provide power for 48V loads and the third battery module is connected in series to power 12V loads. When a potential issue with one of the blocks is discovered, the block is isolated and discharged. In the example shown, block 8 is determined to have a potential issue, as designated by the shown 'X' on clock 8. As a result, the second battery module is reconnected in a parallel arrangement, instead of being in a series arrangement and block 8 is isolated, discharged and tested. A couple of examples are shown where the second battery module is reconnected in a parallel arrangement to provide the SPS arrangement and where the second and third battery modules are reconnected to provide the SPP arrangement.

To discharge block 8, a discharge process is performed including quickly connecting block 8 to TMS loads to quickly discharging block 8. Block 8 may be discharged to a predetermined SOC level. In another embodiment, the second battery module is discharged and then block 8 is isolated.

The ASM module 241 of FIGS. 2-5 continues to monitor the state of block 8 while discharging. The block is discharged to a SOC for which there is not a thermal hazard. The ASM module 241 may monitor and diagnose issues with the blocks 1-12 including diagnosing generated safety fault signals. As an example, a safety fault signal may be generated when a temperature of a block exceeds 75° C. and/or when a rate of change in voltage of a block is greater than a predetermined level. Other safety fault conditions are disclosed herein. In the example shown in FIG. 7, the suspicious and/or faulty block is disconnected from the power grid and the remaining blocks are connected and continued to be used based on grid priorities for power from the blocks. When connecting the suspicious and/or faulty block to TMS loads, discharging protocols are followed and the suspicious and/or faulty block is discharged according to a particular mode. The particular mode may be a constant current mode, a constant voltage mode, a constant power mode, and/or a dynamic maximum power mode.

The constant current mode includes setting a current output of the suspicious and/or faulty block to a predetermined maximum level and drawing an amount of current from the suspicious and/or faulty block at a level that is less the predetermined maximum level. The constant voltage mode includes setting a voltage value down to which to discharge the suspicious and/or faulty block. The constant power mode includes setting a power output of the suspicious and/or faulty block to a predetermined maximum level and drawing an amount of power from the suspicious and/or faulty block at a level that is less the predetermined maximum level. The dynamic maximum power mode includes adjusting the predetermined maximum level to provide a highest called (or requested) power output without further overheating the suspicious and/or faulty block.

The following FIGS. 8-11 are provided as examples to illustrate reconfiguring connections of a suspicious and/or faulty block. The examples of FIGS. 8-11 may be applied to and/or represent operation of any of the vehicle, MODACS, and/or ASM systems disclosed herein. The switches described with respect to FIGS. 8-11 may be of any of the types referred to herein.

Figure 8:
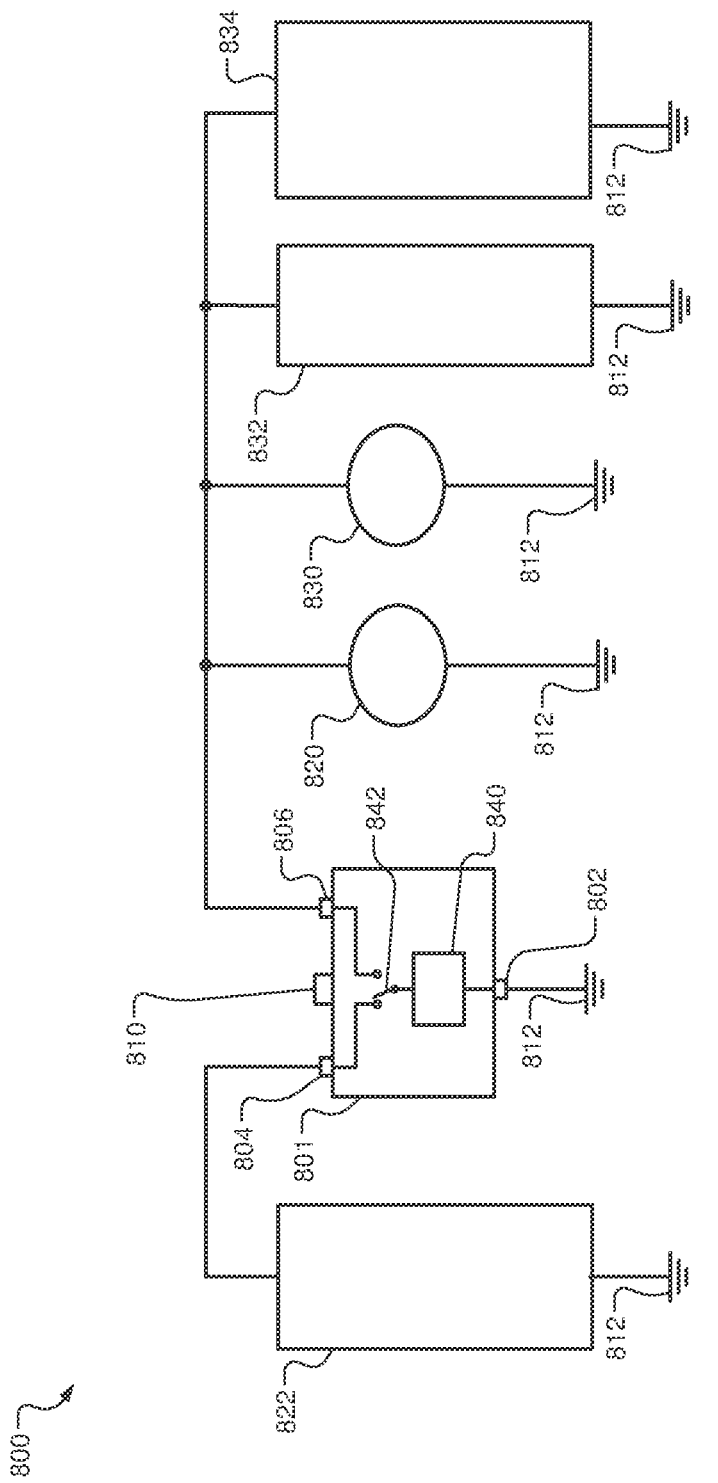
FIG. 8 is a functional block diagram of an example MODACS having a single voltage battery mode (VBM) and including 12V terminals connected to thermal management system (TMS) loads and other 12V loads in accordance with the present disclosure.

FIG. 8 shows a MODACS system 800 including a MODACS 801 that includes a negative (or ground reference) terminal 802, source terminals 804, 806, and a MODACS control module 810. FIG. 8 illustrates a MODACS having a single voltage battery mode (VBM) or single 12V mode. Although two 12V source terminals are shown, the MODACS 801 may include any number of source terminals having 12V and/or other source voltages. The source terminals 804, 806 supply and/or receive 12V power. The source terminal 804 may be referred to as an idle terminal. The source terminal 804 may be connected to TMS 12V loads 822, such as the TMS loads referred to above. The source terminal 806 may be connected to a generator unit 820, a starter 830, 12V loads 832 and 12V redundant loads 834. The negative terminal 802, TMS 12V loads 822, 12V generator 820, 12V starter 830, 12V loads 832 and 12V redundant loads 834 may be connected to a ground reference terminal 812.

FIG. 8 shows a simplified representation of the MODACs 801 to illustrate switching of a suspicious and/or faulty block 840 from vehicle 12V loads to TMS 12V loads 822 (or simply TMS) for discharging purposes. The MODACS 801 may be configured similarly as the MODACS of FIGS. 1-5. The TMS 12V loads 822 are located external and separate from the MODACS 801. The MODACS 801 includes one or more switches (e.g., a single switch 842 is shown) for connecting the block 840 to the source terminals 804 and 806. While the block 840 is connected to the TMS 12V loads 822, other blocks of the MODACS 801 may be connected to and supply power to the source terminal 806. The block 840 may be discharged to a predetermined SOC and other blocks of the MODACS 801 that do not satisfy a safety fault condition (referred to as "good blocks") may be connected to the power grid and power loads. The good blocks may be connected to TMS loads. As an example, good blocks may be connected to TMS loads for cell balancing and/or block cooling.

Figure 9:
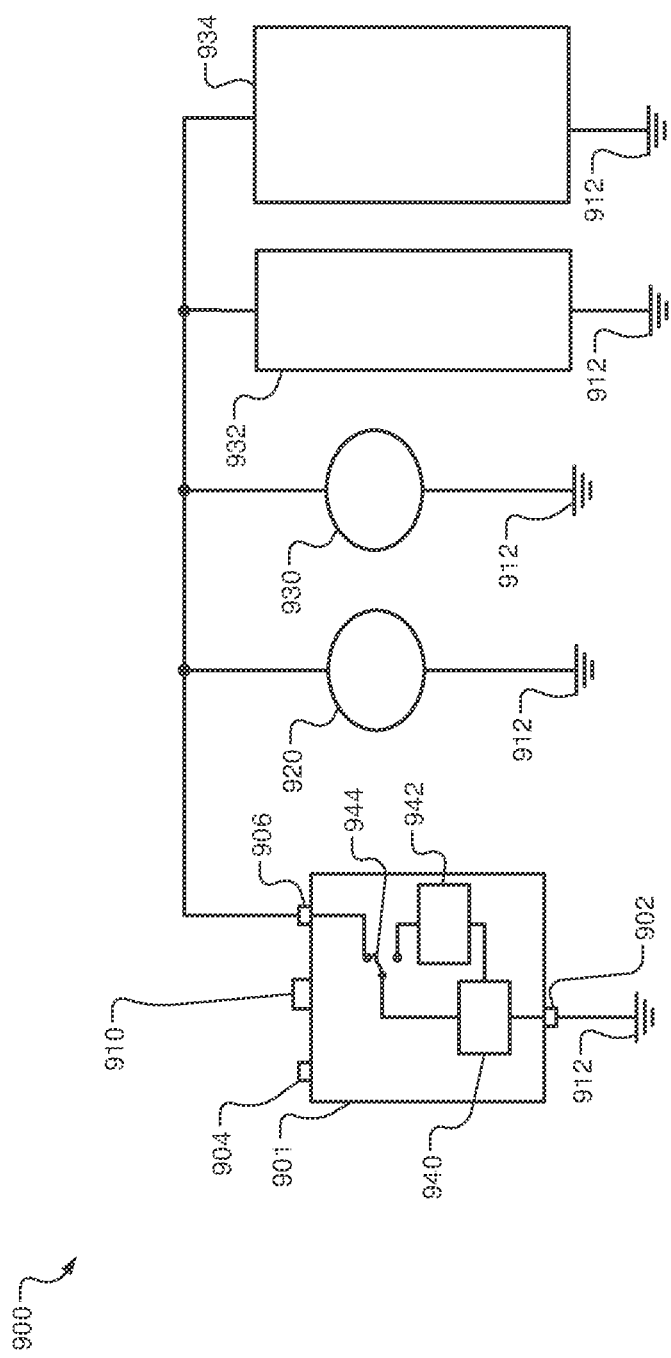
FIG. 9 is a functional block diagram of an example MODACS including TMS load(s) and having terminals connected to other 12V loads in accordance with the present disclosure.

FIG. 9 shows a MODACS system 900 including a MODACS 901 that includes a negative (or ground reference) terminal 902, source terminals 904, 906, and a MODACS control module 910. FIG. 9 illustrates a MODACS having a single VBM or single 12V mode. Although two source terminals are shown, the MODACS 801 may include any number of source terminals having 12V and/or other source voltages. The source terminal 906 supplies and/or receives 12V power. The source terminal 906 may be connected to a generator unit 920, a starter 930, 12V loads 932 and 12V redundant loads 934. The negative terminal 902, 12V generator 920, 12V starter 930, 12V loads 932 and 12V redundant loads 934 may be connected to a ground reference terminal 912.

FIG. 9 shows a simplified representation of the MODACs 901 to illustrate switching of a suspicious and/or faulty block 940 from vehicle 12V loads to a TMS 942, such as that described above, for discharging purposes. The MODACS 901 may be configured similarly as the MODACS of FIGS. 1-5. The TMS 942 is located within the MODACS 901. The MODACS 901 includes one or more switches (e.g., a single switch 944 is shown) for connecting the block 840 to either the TMS 942 or the source terminal 906. While the block 940 is connected to the TMS 942, other blocks of the MODACS 901 may be connected to and supply power to the source terminal 906. The block 940 may be discharged to a predetermined SOC and other blocks of the MODACS 901 that do not satisfy a safety fault condition (referred to as "good blocks") may be connected to the power grid and power loads. The good blocks may be connected to TMS loads. As an example, good blocks may be connected to TMS loads for cell balancing and/or block cooling.

Figure 10:
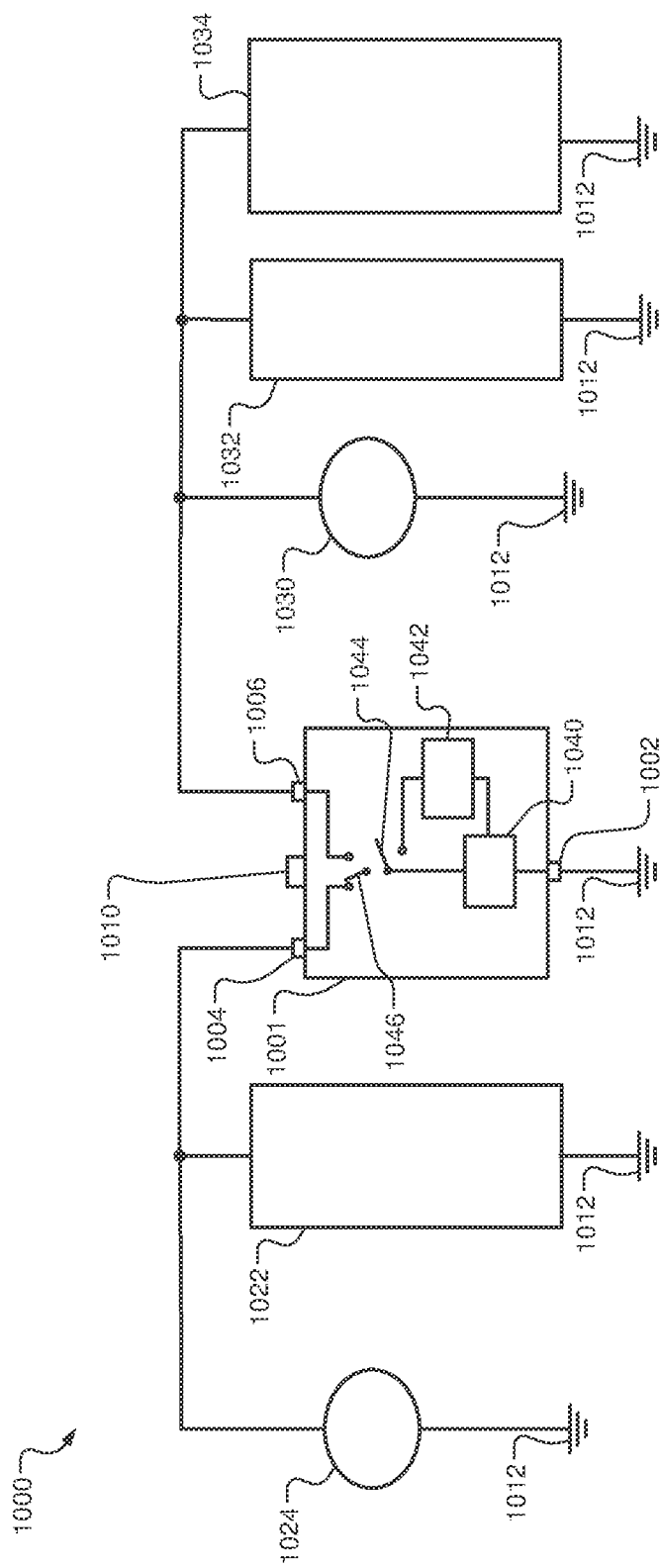
FIG. 10 is a functional block diagram of an example MODACS including TMS load(s) and having terminals connected to other 48V and 12V loads in accordance with the present disclosure.

FIG. 10 shows a MODACS system 1000 including a MODACS 1001 that includes a negative (or ground reference) terminal 1002, source terminals 1004, 1006, and a MODACS control module 1010. FIG. 10 illustrates a MODACS having dual VBMs including a 12V mode and a 48V mode. The MODACS may operate in one or both of the VBM modes at any moment in time. Although a 48V source terminal and a 12V source terminal are shown, the MODACS 1001 may include any number of source terminals having 12V, 48V and/or other source voltages. The source terminals 1004, 1006 supply and/or receive respectively 48V and 12V power. The source terminal 1004 may be connected to 48V loads 1022 and a 48V generator 1024. The source terminal 1006 may be connected to a starter 1030, 12V loads 1032 and 12V redundant loads 1034. The negative terminal 1002, 48V generator 1024, 48V loads 1022, 12V starter 1030, 12V loads 1032 and 12V redundant loads 1034 may be connected to a ground reference terminal 1012.

FIG. 10 shows a simplified representation of the MODACs 1001 to illustrate switching of a suspicious and/or faulty block 1040 from vehicle 12V loads to a TMS 1042 (or simply TMS) for discharging purposes. The MODACS 1001 may be configured similarly as the MODACS of FIGS. 1-5. The TMS 1042 is located internal to the MODACS 1001. The MODACS 1001 includes one or more switches (e.g., switches 1042 and 1044 are shown) for connecting the block 1040 to one of the source terminals 1004, 1006 or the TMS 1042. The first switch 1044 may connect the block 1040 to either the TMS 1042 or to the second switch 1046. The second switch 1046 may connect the block 1040 to either the source terminal 1004 or the source terminal 1006. While the block 1040 is connected to the TMS 1042, other blocks of the MODACS 1001 may be connected to and supply power to the source terminals 1004, 1006. The block 1040 may be discharged to a predetermined SOC and other blocks of the MODACS 1001 that do not satisfy a safety fault condition (referred to as "good blocks") may be connected to the power grid and power loads. The good blocks may be connected to TMS loads. As an example, good blocks may be connected to TMS loads for cell balancing and/or block cooling.

Figure 11:
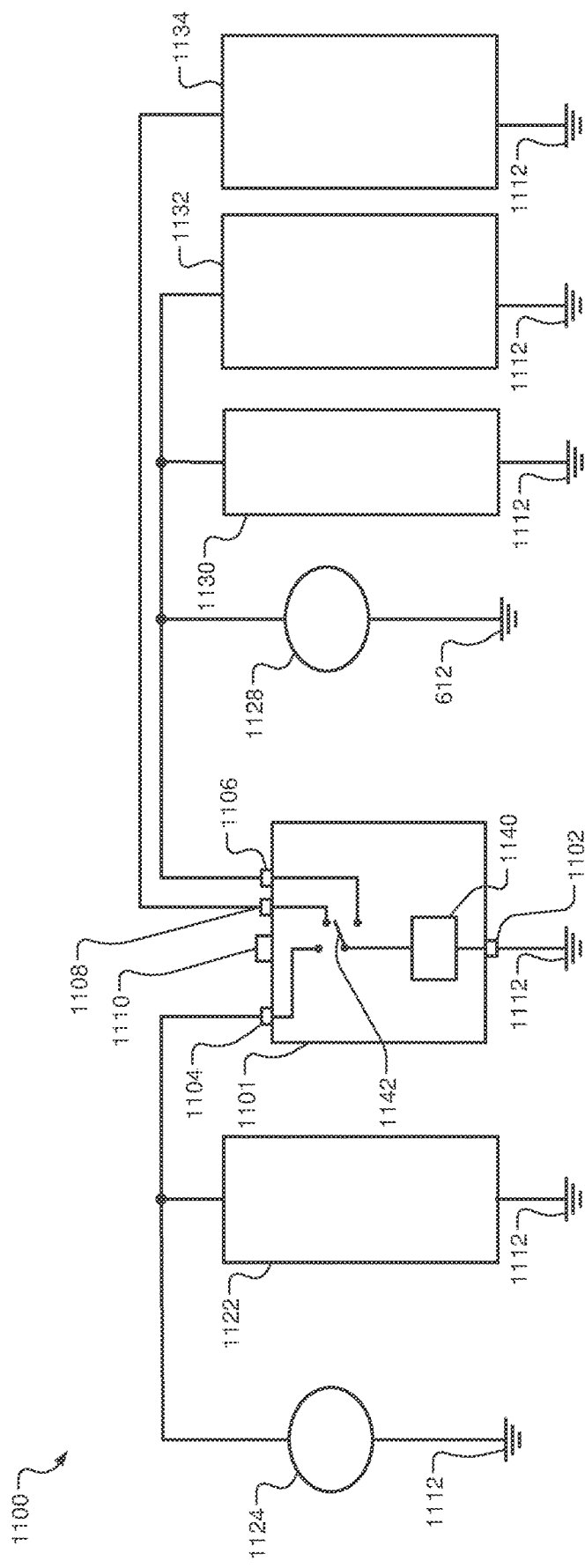
FIG. 11 is a functional block diagram of an example MODACS having terminals connected to 48V loads, 12V TMS loads, and other 12V loads in accordance with the present disclosure.

FIG. 11 shows a MODACS system 1100 including a MODACS 1101 that includes a negative (or ground reference) terminal 1102, source terminals 1104, 1106, 1108, and a MODACS control module 1110. FIG. 11 illustrates a MODACS having a dual VBMs including a 12V mode and a 48V mode. The MODACS may operate in one or both of the VBM modes at any moment in time. Although a 48V source terminal and two 12V source terminals are shown, the MODACS 1101 may include any number of source terminals having 12V, 48V and/or other source voltages. The source terminals 1104, 1106, 1108 supply and/or receive 48V and 12V power. The source terminal 1104 may be connected to 48V loads 1122 and a 48V generator 1124. The source terminal 1106 may be connected to a starter 1128, 12V loads 1130 and 12V redundant loads 1132. The source terminal 1108 may be connected to 12V TMS loads (or TMS) 1134. The negative terminal 1102, 48V generator 1124, 48V loads 1122, 12V starter 1130, 12V loads 1132, 12V redundant loads 1134, and the 12V TMS loads 1134 may be connected to a ground reference terminal 1112.

FIG. 11 shows a simplified representation of the MODACs 1101 to illustrate switching of a suspicious and/or faulty block 1140 from vehicle 12V loads to the TMS loads 1134 for discharging purposes. The MODACS 1101 may be configured similarly as the MODACS of FIGS. 1-5. The TMS loads 1134 are located external to and separate from the MODACS 1101. The MODACS 1101 includes one or more switches (e.g., switch 1142 is shown) for connecting the block 1140 to one of the source terminals 1104, 1106, 1108. While the block 1140 is connected to the TMS loads 1134, other blocks of the MODACS 1101 may be connected to and supply power to the source terminals 1104, 1106, 1108. The block 1140 may be discharged to a predetermined SOC and other blocks of the MODACS 1101 that do not satisfy a safety fault condition (referred to as "good blocks") may be connected to the power grid and power loads. The good blocks may be connected to TMS loads. As an example, good blocks may be connected to TMS loads for cell balancing and/or block cooling.

Although 1 and 2 VBM configurations are described with respect to FIGS. 8-11, the MODACS may have 3 or 4 VBM configurations. In another embodiment, more than 4 VBM configurations are implemented.

Figure 12:
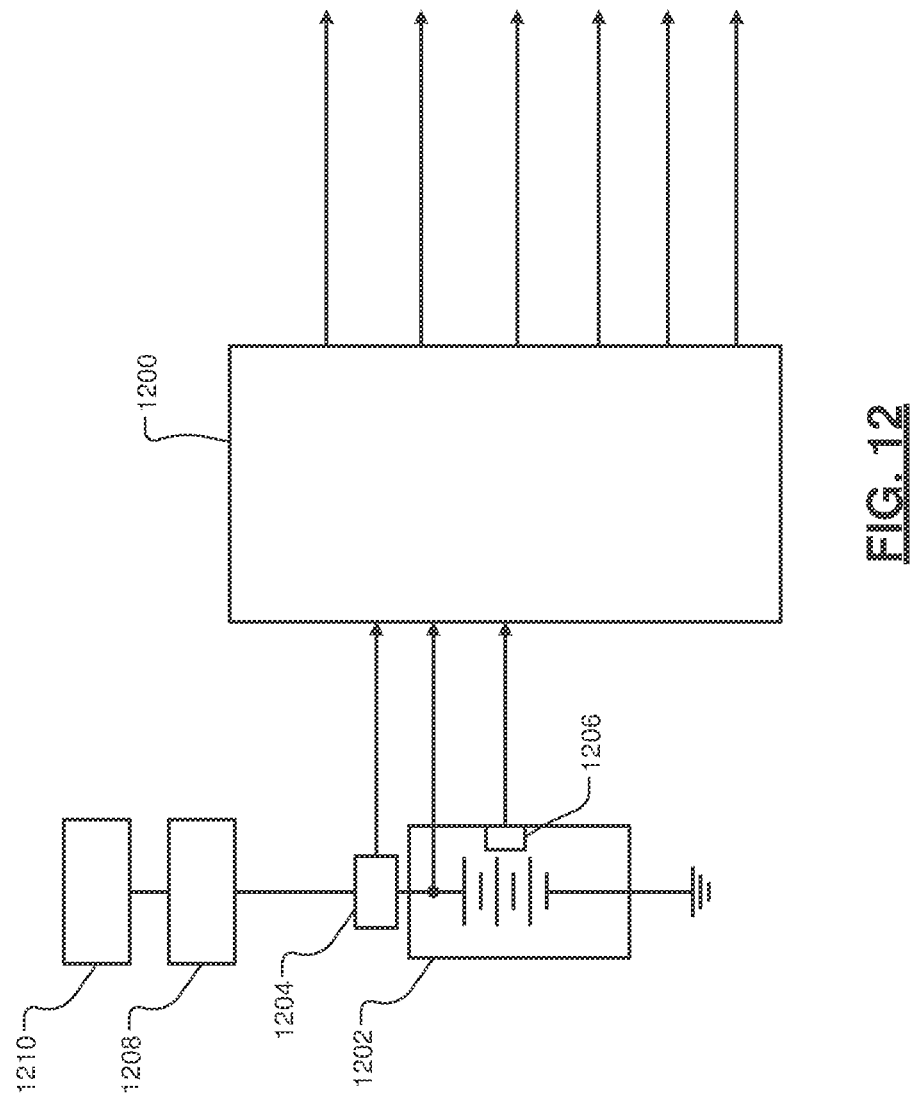
FIG. 12 is a functional block diagram of an example battery monitoring (or management) system (BMS) module for a battery pack in accordance with the present disclosure.

FIG. 12 shows an example battery monitoring (or management) system (BMS) module 1200 for a battery pack 1202 having any number of cells, blocks, and battery modules. In one embodiment, the battery monitoring system module 1200 is provided for each block of cells as part of an ASM system. In the example shown, the BMS module 1200 monitors voltages, temperatures, power levels, and current levels of the corresponding one or more cells of the block or pack 1202 and determines certain parameters. The parameters may include instantaneous charge and discharge power and current limits, short term charge and discharge power and current limits, and continuous charge and discharge power and current limits. The parameters may also include minimum and maximum voltages, minimum and maximum operating temperatures, and SOX limits and/or values. The parameters output by the BMS module 1200 may be determined based on the voltages, temperatures and/or current levels monitored. The charge and discharge power and current capability of a 12V block or pack is affected by the minimum and maximum voltages, minimum and maximum operating temperatures, and SOX limits and/or values of the corresponding cells. The BMS module 1200 may monitor individual cell voltages, temperatures and current levels and determine based on this information the stated parameters. The parameters output by the BMS module 1200 are shown as arrow out of the BMS module 1200. The parameters received by the BMS module 1200 are shown as arrow directed to the BMS module 1200. The BMS module 1200 may generate safety fault signals when certain safety fault conditions are detected, such as the safety fault conditions referred to herein.

As an example, the BMS module 1200 may include and/or be connected to sensors, such as a current sensor 1204 and a temperature sensor 1206, which may be used to detect current levels through the cells of block or pack 1202 and temperatures of the block or pack 1202. As an example, a voltage across the block or pack may be detected as shown. In an embodiment, one or more voltage sensors may be included to detect voltages of the block or pack 1202. The current sensor 1204 may be connected, for example, between the block or pack 1202 and a source terminal 1208, which may be connected to a load 1210. The temperatures, voltages, and current levels are reported to the BMS module 1200 and/or the ASM module 241 (shown in FIGS. 2-5 and 13) as some of the parameters received by the BMS module 1200.

Figure 13:
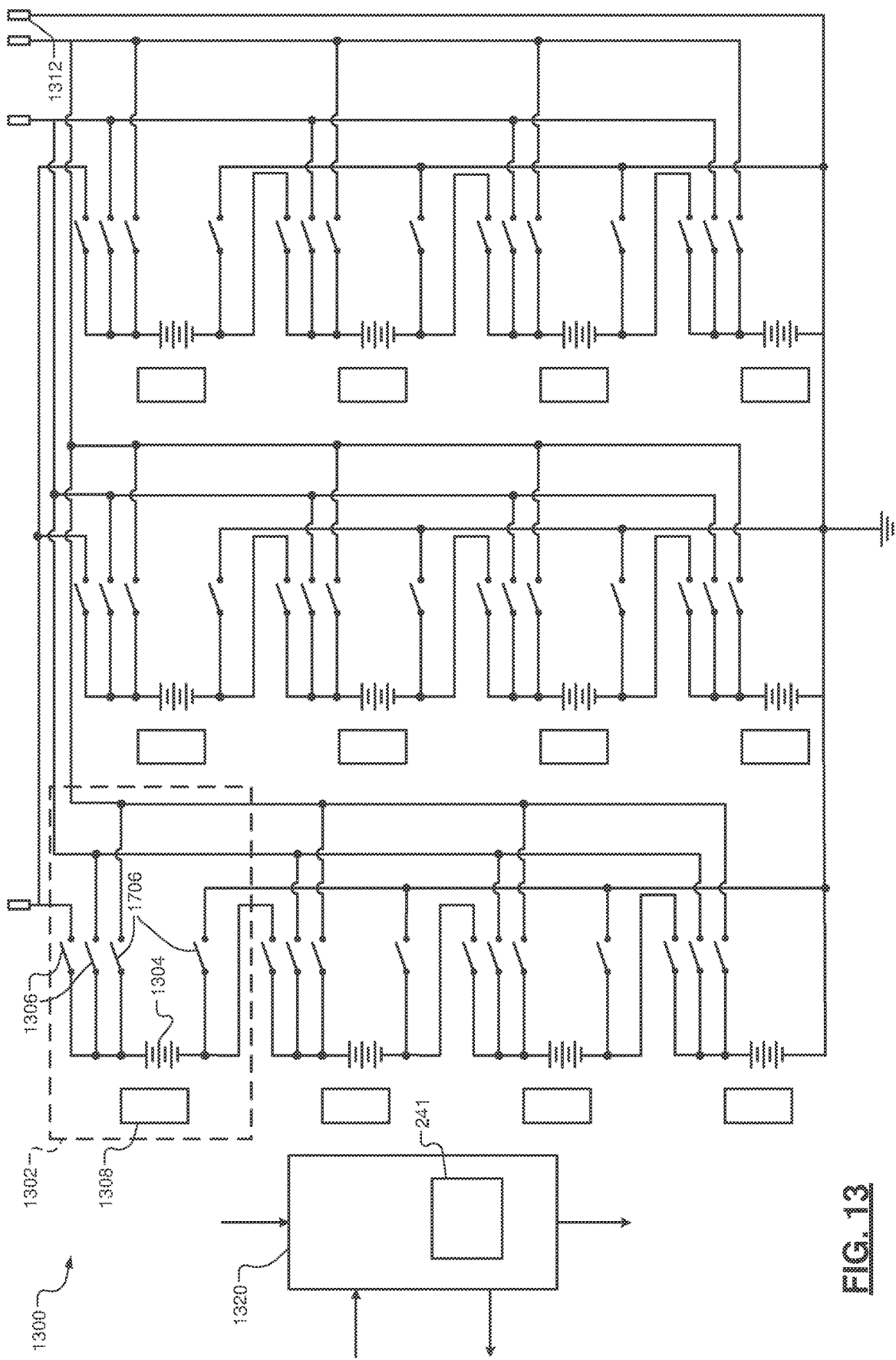
FIG. 13 is a schematic of an example portion of a MODACS circuit in accordance with the present disclosure.

FIG. 13 shows a portion of a MODACS circuit 1300 that includes one or more source terminals. The MODACS circuit 1300 may include multi-functional solid-state switches, switch drive circuits, current and voltage sense circuits arranged in a minimum switch count topology to enable on-demand capacity allocation for source terminals having similar or dissimilar preset (or target) voltages. The MODACS circuit 1300 is flexible, modular, and has minimum size, complexity, weight, and component count. For at least these reasons, the MODACS circuit 1300 minimizes manufacturing difficulty.

As shown, the MODACS circuit 1300 includes block sets, where each block set includes 4 cells, 4 or more switches, a BMS module and source terminals with corresponding power rails. An example block set 1302 is outlined and includes a block of cells 1304, 4 switches 1306 and a BMS module 1308. The blocks are shown with battery symbols. Three of the switches 1306 connect the blocks 1304 respectively to source terminals (e.g., a 48V, 12VA, and a 12VB source terminals are shown). The fourth one of the 4 switches 1306 connects the block 1304 to a ground reference (or negative terminal) 1312.

As shown the blocks may be arranged in an array having rows and columns. Each of the blocks may be configured the same except one of the rows closest to the ground reference. In this row, each of the blocks includes three switches instead of four switches. As a result, the corresponding cells are connected to the ground reference without use of switches, as shown.

As can be seen, the blocks may be connected to each of the source terminals. Any block may be connected to any one or more of the source terminals. The first switches in the block sets in one of the rows (or first row) may be connected to the first source terminal (48V source terminal). The first switches in the block sets in one or more intermediate rows (e.g., the second and third rows) may be connected to cell(s) in a previous row. This allows the cell(s) in the blocks in each column to be connected in series. Under certain conditions, the blocks in columns are connected in series to form two or more series of blocks and the multiple series of blocks are connected in parallel to maximize power to the first source terminal.

The MODACS circuit 1300 further includes a MODACS control module 1320 that controls states of the blocks. The MODACS control module 1320 receives BMS signals from the BMS modules and a system capacity request signal from a vehicle control module. Based on priorities of the voltage source terminals, parameters, and power and current demands indicated by the system capacity request signal, the MODACS control module 1320 determines a connected configuration and sets states of the switches of the blocks. The parameters may include voltages, power levels, current levels, and temperatures indicated in the BMS signals. The MODACS control module 1320 generates an actual capacity allocation signal indicating capacity allocation for the source terminals. The actual capacity allocation may not match the requested capacity allocation depending on: the state of the MODACS including whether there is any faults or shorts; and the SOH of the blocks. The actual capacity allocation signal may be transmitted from the MODACS control module 1320 to the vehicle control module.

The MODACS circuit 1300 includes a 12V switching matrix, architecture, and switch controls to enable elimination of 12V stabilization using a DC-to-DC converter, such as a 48V to 12V DC-to-DC buck or boost converter, and/or elimination of 12V and/or 48V redundant back-up power. The MODACS circuit 1300 has a minimal circuit, block, switch configuration for one high power, high voltage (e.g., V1 greater than or equal to 24V) source terminal and at least two low power, low voltage (e.g., two 12V) source terminals. The switches may be solid-state switches for fast noise free reconfiguring. The switches may be configured for bi-directional voltage and current blocking capability to prevent shorts between high and low voltage source terminals. Switches configured for unidirectional voltage and current blocking may be used to minimize losses selectively.

The switches may be implemented in a single chip or in a multi-chip package. The switches may include enhancement mode silicon metal-oxide-semiconductor field-effect-transistors (MOSFETs), gallium nitride (GaN) FETs, silicon carbide (SiC) MOSFETS, insulated-gate bipolar transistors (IGBTs), and/or other suitable switches. The switches may be in an ON state, an OFF state, or a linear operating state for impedance matching purposes. The switches may be integrated together with drivers and interlock logic to prevent short circuits between blocks, between different source terminals, and between a source terminal and a ground reference. The switches are controlled to achieve a desired capacity at each source terminal based on vehicle control module demands and status updates in the form of feedback signals from the BMS modules of the blocks.

In an embodiment, the cells of the blocks are lithium battery cells, but may be other types of cells. The example of FIG. 13 is shown to illustrate a minimalistic architecture having a minimal number of blocks and switches per block set to provide 48V, 12VA and 12VB outputs without a DC-to-DC converter.

Figure 14:
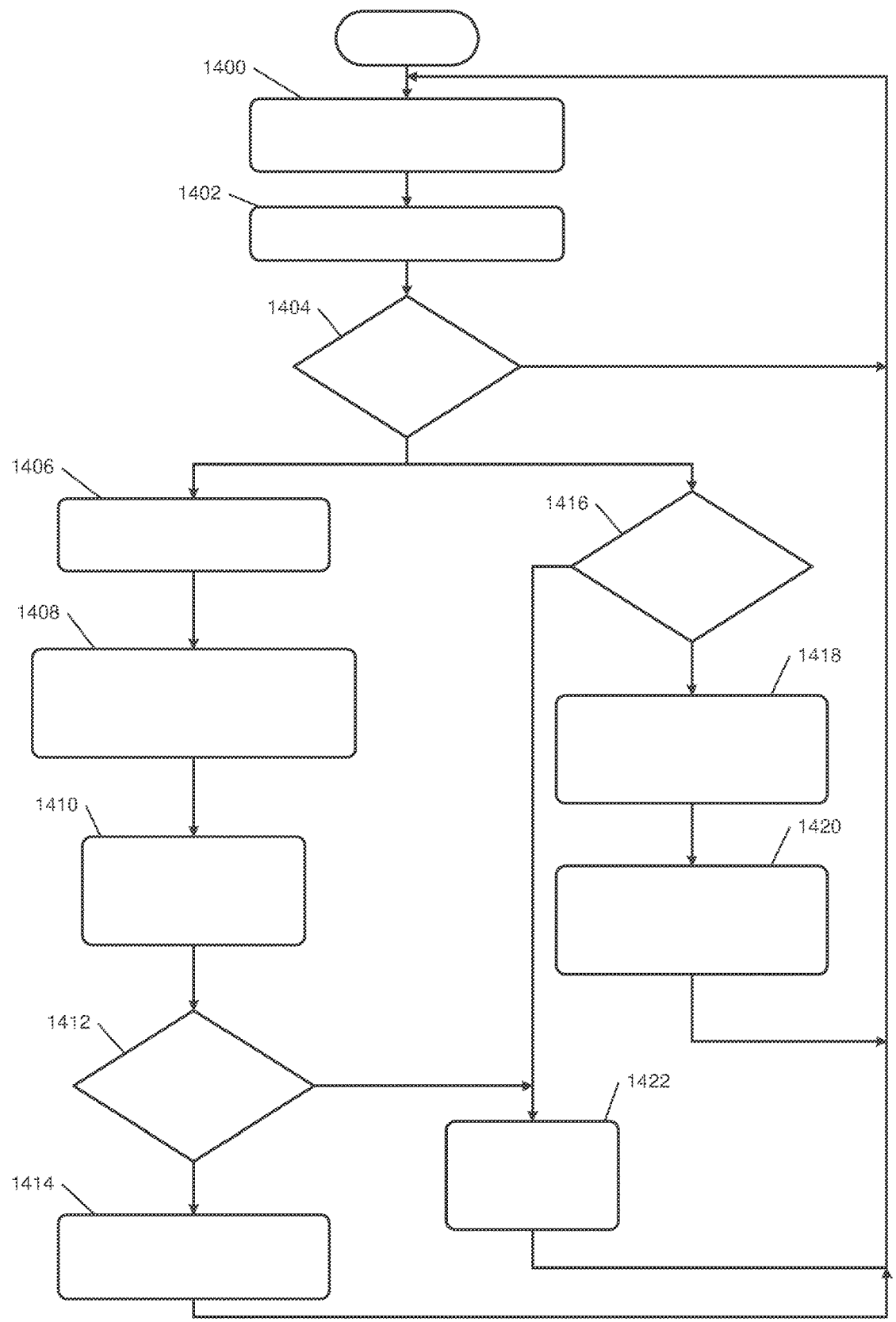
FIG. 14 illustrates an ASM method in accordance with the present disclosure.

FIG. 14 shows an ASM method that may be implemented by any of the vehicle systems and ASM systems disclosed herein. The method may be iteratively performed. The method may begin at 1400, which includes operating in a normal mode including supporting low voltage loads (e.g., 12V loads) with 12V blocks. Other voltage loads may also be supplied power, such as 48V loads.

At 1402, a BMS module (e.g., the BMS module 1200 of FIG. 12) and/or the ASM module 241 may detect states of the blocks of cells, including temperatures, voltages, current levels, power levels, rates of change in temperature, voltage, current and power, etc. This may include monitoring the SOX parameters and/or other block status parameters.

At 1404, the BMS module and/or the ASM module 241 may determine whether one or more safety fault conditions exist based on the detected states of the blocks of cells. The BMS module and/or the ASM module 241 may monitor safety fault prognostics such as generation of an abnormal thermal signal. Temperatures of blocks are monitored. The blocks may be considered to be in good standing while the temperatures of the blocks are within expected and acceptable temperature ranges associated with (i) a current loading condition, and (ii) locations of the blocks in the corresponding MODACS. The expected temperature ranges account for normal temperature variations for certain block loading and locations of the blocks. If however, a temperature changes (increases or decreases) to be outside a predetermined expected temperature range and/or changes at a rate greater than a predetermined threshold (e.g., more than 1° C./second), then a safety fault condition exists. Other safety fault conditions include abnormal changes in voltage, current, or power. For example, if the voltage of a block decreases to be 25% of V0 (or 25% of 12V). The abnormalities may be associated with an electrical short, a loose wire and/or connection, a faulty cell, etc. In one embodiment, when an abnormal condition exists for more than a predetermined (e.g., 3 seconds), a safety fault condition is deemed to exist.

When a safety fault condition exists, the corresponding 12V block is deemed to be suspicious and may be faulty.

If a suspicious 12V block is detected operations 1406 and 1416 are performed, otherwise operation 1400 is performed. Operations 1406, 1408, 1410, 1412, 1414 may be performed while operations 1416, 1418, and 1420 are performed. This allows the suspicious block to be isolated, discharged, and checked out while other blocks are powering vehicle loads and thereby allowing other vehicle operations to continue. This allows a vehicle to drive to a destination (e.g., a residential home, a parking lot, a service station, etc.)

At 1406, the ASM module 241 and/or corresponding MODACS control module disconnects the suspicious 12V block from the power grid. In one embodiment, other blocks in the same battery module as the suspicious block are also disconnected.

The following operations 1408 and 1410 may be performed in parallel and for a predetermined period of time. At 1408, the ASM module 241 and/or corresponding MODACS control module connects the suspicious block and/or faulty block to a TMS, such as to any of the TMS loads disclosed herein, and discharges the suspicious and/or faulty block. This may be done while maintaining the suspicious block below a maximum operating temperature. Other blocks in the same battery module as the suspicious block may also be connected to the TMS. The other blocks may include suspicious blocks and/or blocks in good standing. The blocks may be in the same battery module and/or may be adjacent to the suspicious block of concern. The block(s) may be discharged to a predetermined level (e.g., 0-20% state of charge or 0-5% state of charge). The ASM module 241 may discharge the block(s) according to any of the above-stated discharge protocols and modes, such as the constant current mode, the constant voltage mode, the constant power mode, and/or the dynamic maximum power mode.

At 1410, the BMS module and/or the ASM module 241 monitors and diagnoses block parameters of the suspicious block including temperatures and SOX parameters. This may occur while discharging the suspicious block and to check a quality level of the suspicious block to determine if the block was simply overcharged or has a faulty issue unrelated to overcharging. This may include testing the suspicious block to determine whether the suspicious block is in good standing. The testing may include temporarily connecting the suspicious block to a load and monitoring parameters of the block.

At 1412, the ASM module 241 may determine whether the suspicious block is faulty or is in good standing. If faulty, operation 1414 is performed. If in good standing, operation 1416 is performed. At 1414, the ASM module 241 may permanently or indefinitely isolate the faulty block until serviced and/or replaced.

At 1416, the ASM module 241 may determine if the remainder of blocks are in good standing. If yes, operation 1418 may be performed, If not, operation 1422 may be performed. At 1418, the ASM module 241 may reconfigure the good standing 12V blocks to continue operation according to programmed grid priority criteria and loading demands.

At 1420, the ASM module 241 adjusts MODACS working mode to support low voltage (12V) loads (and/or high-voltage (48V) loads) with good standing blocks.

At 1422, the ASM module 241 resets the MODACS configuration with the previously suspicious block, which has been determined to be in good standing, and the other blocks that are in good standing. This may include, for example, (i) reconnecting the previously suspicious block and/or returning battery modules to serial and/or parallel arrangements that existed prior to isolating the previously suspicious block, or (ii) configuring the blocks in a different arrangement. Operation 1400 may be performed subsequent to operation 1420 and 1422.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described method provides an example of when switching between different battery module configurations is performed. Different example configurations for three battery modules are listed in Table 1.

TABLE 1

| Mode # | Phase 1 (Mode) | Phase 2 | Phase 3 | Description | Vectoring Possibilities | Comments |
|---|---|---|---|---|---|---|
| 1 | XXX | XXX | XXX | All Disconnected | Cell Balancing (CB) Only | OFF |
| 2 | XXP | PXX | XPX | 1 Module in Parallel | CB and Time Duration (TD) and 1 Block of an Active Parallel Module | 1 Block Variant for Sleep Mode |
| 3 | XXS | SXX | XSX | 1 Module in Series | CB and TD and | Low Priority |
| 4 | XPP | PXP | PPX | 2 Modules in Parallel | CB and TD and 1 Block of an Active Parallel Module | Diagnostic Mode |
| 5 | XPS | SXP | PSX | 1 Module Each in Series & Parallel | CB and TD and 1 Block of an Active Parallel Module | Low Power 2VBM Mode with Diagnostics |
| 6 | XSS | SXS | SSX | 2 Modules in Series | CB and TD | Low Priority |
| 7 | PPP | PPP | PPP | All Modules in Parallel | CB and TD and 1 Block of an Active Parallel Module | Turn Off During Crank |
| 8 | PPS | SPP | PSP | 2 Modules in Parallel and 1 Module in Series | CB and TD and 1 Block of an Active Parallel Module | Normal 2VBM Mode |
| 9 | PSS | SPS | SSP | 2 Modules in Series and 1 Module in Parallel | CB and TD and 1 Block of an Active Parallel Module | Normal 2VBM Mode |
| 10 | SSS | SSS | SSS | All Modules in Series | CB and TD | 48 V Only |
| 11 | S'S'S' | S'S'S' | S'S'S' | All Modules in Series and Bottom String in Parallel for 12 V | None | Rare, High Power 2VBM Mode |

As an example, if operating in the parallel-parallel-series (PPS) mode and it is determined that there is a bad block in the first battery module, then a transition to the XPS mode may occur, where X means that the first battery module is disconnected. If in the XPS mode and there is an increase in demanded load and the first battery module is in good condition, then a transition to the SPS mode may be performed. Other various transitions between the modes shown in Table 1 may be performed depending on the statuses of the blocks and the load demands.

A MODACS may have an architecture where the number of blocks is greater than or equal to 2. In one embodiment, the MODACS has an architecture where the number of blocks is 3-12. In another embodiment, the MODACS has an architecture where the number of blocks is 3-9.

The disclosed MODACS implementations allow a suspicious and/or faulty block (may be referred to as a safety fault block) to be isolated and discharged independent of system power. This is implemented to avoid losing power to other vehicle systems while discharging and diagnosing the suspicious and/or faulty block. The suspicious and/or faulty block may be provided with a dedicated discharge path. A block may include low resistance materials and be discharged when, for example, a temperature of the block exceeds a predetermined temperature (e.g., 75° C. or 85° C.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system comprising:
a modular dynamically allocated capacity storage system (MODACS) comprising a plurality of blocks of cells; and
an active management module configured to:
  detect a first state of a first block of cells of the plurality of blocks of cells;
  determine whether a safety fault condition exists with the first block of cells based on the first state of the first block of cells;
  in response to detecting existence of the safety fault condition, disconnect and isolate the first block of cells from other ones of the plurality of blocks of cells;
  subsequent to isolating the first block of cells, actively discharge and detect a second state of the first block of cells; and
  based on the second state, continue isolating the first block of cells or reconnecting the first block of cells to the other ones of the plurality of blocks of cells such that the first block of cells is no longer isolated.

2. The vehicle system of claim 1, wherein:
the MODACS includes a source terminal; and
the active management module is configured to:
  determine whether to connect the first block of cells to the source terminal or a thermal management system to discharge the first block of cells; and
  control the MODACS to connect the first block of cells to the source terminal or the thermal management system.

3. The vehicle system of claim 2, wherein the active management module is configured to connect the first block of cells to the thermal management system when the safety fault condition exists and to the source terminal when the safety fault condition does not exist.

4. The vehicle system of claim 2, wherein the thermal management system includes at least one of a cooling fan, a cooling pump, a cell balancing system, a resistive load, or a thermal electric generator.

5. The vehicle system of claim 4, wherein the active management module is configured to run, via power from the first block of cells, at least one of the cooling fan or the cooling pump to cool at least one of the plurality of blocks of cells in response to the safety fault condition existing.

6. The vehicle system of claim 1, wherein the first state and the second state of the first block of cells refers to at least one of: a current level of the first block of cells; a voltage level of the first block of cells; a power level of the first block of cells; a temperature of the first block of cells; or a rate of change in a parameter of the first block of cells.

7. The vehicle system of claim 1, further comprising a thermal management system separate from the MODACS and comprising 12V thermal management system loads, wherein:
the MODACS includes a first source terminal and a second source terminal;
the first source terminal is connected to the 12V thermal management system loads;
the second source terminal is connected to other loads; and
the active management module is configured to determine whether to connect the first block of cells to the first source terminal or the second source terminal and control the MODACS to connect the first block of cells to the selected one of the first source terminal or the second source terminal.

8. The vehicle system of claim 1, wherein:
the MODACS comprises;
  a thermal management system; and
  a first source terminal connected to a first plurality of loads; and
the active management module is configured to determine whether to connect the first block of cells to the first source terminal or the thermal management system and control the MODACS to connect the first block of cells to the selected one of the first source terminal or the thermal management system.

9. The vehicle system of claim 8, wherein:
the MODACS comprises a second source terminal connected to a second plurality of loads; and
the active management module is configured to determine whether to connect the first block of cells to the first source terminal, the second source terminal or the thermal management system and control the MODACS to connect the first block of cells to the selected one of the first source terminal, the second source terminal or the thermal management system.

10. The vehicle system of claim 1, wherein:
the MODACS comprises:
  a first source terminal connected to a first plurality of loads;
  a second source terminal connected to a second plurality of loads; and
  a third source terminal connected to a thermal management system; and
the active management module is configured to determine whether to connect the first block of cells to the first source terminal, the second source terminal or the third source terminal and control the MODACS to connect the first block of cells to the selected one of the first source terminal, the second source terminal or the third source terminal.

11. A method of operating a modular dynamically allocated capacity storage system (MODACS), the method comprising:

detecting a first state of a first block of cells of a plurality of blocks of cells within the MODACS;

determining whether a safety fault condition exists with the first block of cells based on the first state of the first block of cells;

in response to detecting existence of the safety fault condition, disconnecting and isolating the first block of cells from other ones of the plurality of blocks of cells;

subsequent to isolating the first block of cells, actively discharging and detecting a second state of the first block of cells; and based on the second state, continuing to isolate the first block of cells or reconnecting the first block of cells to the other ones of the plurality of blocks of cells such that the first block of cells is no longer isolated.

12. The method of claim 11, further comprising:

determining whether to connect the first block of cells to a source terminal of the MODACS or a thermal management system to discharge the first block of cells; and controlling the MODACS to connect the first block of cells to the source terminal or the thermal management system.

13. The method of claim 12, further comprising connecting the first block of cells to the thermal management system when the safety fault condition exists and to the source terminal when the safety fault condition does not exist.

14. The method of claim 12, wherein the thermal management system includes at least one of a cooling fan, a cooling pump, a cell balancing system, a resistive load, or a thermal electric generator.

15. The method of claim 14, further comprising running, via power from the first block of cells, at least one of the cooling fan or the cooling pump to cool at least one of the plurality of blocks of cells in response to the safety fault condition existing.

16. The method of claim 11, wherein the first state and the second state of the first block of cells refers to at least one of: a current level of the first block of cells; a voltage level of the first block of cells; a power level of the first block of cells; a temperature of the first block of cells; or a rate of change in a parameter of the first block of cells.

17. The method of claim 11, further comprising determining whether to connect the first block of cells to a first source terminal or a second source terminal of the MODACS and control the MODACS to connect the first block of cells to the selected one of the first source terminal or the second source terminal, wherein:

the first source terminal is connected to 12V thermal management system loads;

the 12V thermal management system loads are separate from the MODACS; and the second source terminal is connected to other loads.

18. The method of claim 11, further comprising determining whether to connect the first block of cells to a first source terminal of the MODACS or a thermal management system and control the MODACS to connect the first block of cells to the selected one of the first source terminal or the thermal management system, wherein:

the MODACS comprises the thermal management system; and the first source terminal is connected to a first plurality of loads.

19. The method of claim 18, further comprising determining whether to connect the first block of cells to the first source terminal, a second source terminal or the thermal management system and control the MODACS to connect the first block of cells to the selected one of the first source terminal, the second source terminal or the thermal management system, wherein the MODACS comprises the second source terminal, which is connected to a second plurality of loads.

20. The method of claim 11, further comprising determining whether to connect the first block of cells to a first source terminal, a second source terminal or a third source terminal of the MODACS and control the MODACS to connect the first block of cells to the selected one of the first source terminal, the second source terminal or the third source terminal, wherein:

the first source terminal is connected to a first plurality of loads;

the second source terminal is connected to a second plurality of loads; and the third source terminal is connected to a thermal management system.

* * * * *